US009713048B2

(12) United States Patent
Jung et al.

(10) Patent No.: US 9,713,048 B2
(45) Date of Patent: Jul. 18, 2017

(54) METHOD FOR MEASUREMENT IN WIRELESS COMMUNICATION SYSTEM AND APPARATUS FOR THE SAME

(71) Applicant: LG ELECTRONICS INC., Seoul (KR)

(72) Inventors: Sung Hoon Jung, Anyang-si (KR); Sung Jun Park, Anyang-si (KR); Jae Wook Lee, Anyang-si (KR); Young Dae Lee, Anyang-si (KR); Seung June Yi, Anyang-si (KR)

(73) Assignee: LG ELECTRONICS INC., Seoul (KR)

( * ) Notice: Subject to any disclaimer, the term of this patent is extended or adjusted under 35 U.S.C. 154(b) by 71 days.

(21) Appl. No.: 14/347,195

(22) PCT Filed: Oct. 2, 2012

(86) PCT No.: PCT/KR2012/007987
§ 371 (c)(1),
(2) Date: Mar. 25, 2014

(87) PCT Pub. No.: WO2013/051837
PCT Pub. Date: Apr. 11, 2013

(65) Prior Publication Data
US 2014/0228030 A1    Aug. 14, 2014

Related U.S. Application Data

(60) Provisional application No. 61/542,279, filed on Oct. 2, 2011.

(51) Int. Cl.
*H04W 36/00*    (2009.01)
*H04W 8/26*    (2009.01)
(Continued)

(52) U.S. Cl.
CPC ......... *H04W 36/0088* (2013.01); *H04W 8/26* (2013.01); *H04W 24/08* (2013.01);
(Continued)

(58) Field of Classification Search
CPC .................................................... H04W 36/06
(Continued)

(56) References Cited

U.S. PATENT DOCUMENTS 8,254,923 B2 *  8/2012  Jung ............... H04W 36/30
                                                     455/434
8,594,674 B2 * 11/2013  Jung ............... H04W 36/0083
                                                     455/115.2
(Continued)

FOREIGN PATENT DOCUMENTS

EP           1835780 A2 *  9/2007 ........ H04W 36/0083
KR      10-2005-0020720 A      3/2005
(Continued)

*Primary Examiner* — Vladimir Magloire
*Assistant Examiner* — Majid Syed
(74) *Attorney, Agent, or Firm* — Birch, Stewart, Kolasch & Birch, LLP

(57) ABSTRACT

A method for measuring performed by a user equipment (UE) in a wireless communication system is provided. The method includes: camping on a serving cell operating on a serving frequency; receiving a reselection priority information, the reselection priority information indicating signaled priorities for the serving frequency and a inter-frequency; determining whether to apply an implicit highest priority to the serving frequency for measurement; and measuring the inter-frequency based on the signaled priorities. The step of the determining comprises: wherein if the UE receives a logged measurement configuration for a logged Minimization Driving Test (MDT) and a type of the serving cell is a
(Continued)

predetermined type, determining to apply a signaled priority for the serving frequency indicated by the reselection priority indication.

7 Claims, 22 Drawing Sheets

(51) Int. Cl.
  *H04W 24/08*    (2009.01)
  *H04W 36/36*    (2009.01)
  *H04W 48/02*    (2009.01)

(52) U.S. Cl.
  CPC ....... *H04W 36/0083* (2013.01); *H04W 36/36* (2013.01); *H04W 48/02* (2013.01)

(58) Field of Classification Search
  USPC ................... 455/436, 437; 370/331
  See application file for complete search history.

(56) References Cited

U.S. PATENT DOCUMENTS

| | | |
|---|---|---|
| 8,787,834 B2 * | 7/2014 | Lee et al. .................. 455/67.11 |
| 2005/0090278 A1 | 4/2005 | Jeong et al. |
| 2010/0222060 A1 | 9/2010 | Zhang et al. |

FOREIGN PATENT DOCUMENTS

| | | |
|---|---|---|
| KR | 10-2010-0044876 A | 4/2010 |
| WO | WO 02008/157573 A1 | 12/2008 |

* cited by examiner

… (1)

METHOD FOR MEASUREMENT IN WIRELESS COMMUNICATION SYSTEM AND APPARATUS FOR THE SAME

CROSS REFERENCE TO RELATED APPLICATIONS

This non-provisional application is a National Stage entry under U.S.C. §371 of International Application No. PCT/KR2012/007987 filed on Oct. 2, 2012, which claims the benefit of U.S. Provisional Application No. 61/542,279 filed on Oct. 2, 2011. The entire contents of all of the above applications are hereby incorporated by reference.

TECHNICAL FIELD

The present invention relates to a wireless communication, more particularly, to a method and an apparatus for measurement in a wireless communication system.

BACKGROUND ART

3$^{rd}$ generation partnership project (3GPP) long term evolution (LTE) is an improved version of a universal mobile telecommunication system (UMTS) and is introduced as the 3GPP release 8. The 3GPP LTE uses orthogonal frequency division multiple access (OFDMA) in a downlink, and uses single carrier-frequency division multiple access (SC-FDMA) in an uplink. The 3GPP LTE employs multiple input multiple output (MIMO) having up to four antennas. In recent years, there is an ongoing discussion on 3GPP LTE-advanced (LTE-A) that is an evolution of the 3GPP LTE.

A micro cell, a femto cell, and a pico cell, etc., having a small service area can be installed in a specific location of a macro cell having a wide coverage.

Due to mobility of a user equipment (UE) represented as a mobile device, quality of a currently provided service may deteriorate or a cell capable of providing a better service may be detected. Accordingly, the UE may move to a new cell, which is called performing of the mobility of the UE.

In order to perform the mobility, the UE persistently performs measurement on a serving cell and a neighboring cell. When the measurement result satisfies a condition for performing the mobility, the UE can receive an instruction from the serving cell and can directly perform the mobility.

There may be a particular type of cell providing a service only to an access-permitted member UE. Such a cell may be, for example, a closed subscriber group (CSG) cell. When a UE performs mobility, the UE determines whether or not the UE itself is a member when a target cell is a CSG cell. Only when the UE itself is a member of the target cell, the UE may access the corresponding cell.

In the foregoing wireless communication system, in order to support mobility of a UE, predetermined type cell identification information may be reserved in order to first discriminate a particular type of cell such as the CSG cell. A network may provide the reserved cell identification information to the UE to allow the UE to perform mobility more effectively.

In the foregoing wireless communication system where the highest priority is allocated to a frequency on which a predetermined type cell is operating, a measurement result reported by a UE may be very limited. In this case, a network is not able to properly optimize a performance of the network in basis of the measurement result. Therefore, it is needed that a priority is changeably applied to a serving frequency in a measurement process.

SUMMARY OF INVENTION

Technical Problem

The present invention provides a measurement method performed by a user equipment in a wireless communication system and an apparatus supporting the same.

Solution to Problem

In an aspect, a method for measuring performed by a user equipment (UE) in a wireless communication system is provided. The method includes: camping on a serving cell operating on a serving frequency; receiving a reselection priority information, the reselection priority information indicating signaled priorities for the serving frequency and a inter-frequency; determining whether to apply an implicit highest priority to the serving frequency for measurement; and measuring the inter-frequency based on the signaled priorities. The step of the determining comprises: wherein if the UE receives a logged measurement configuration for a logged Minimization Driving Test (MDT) and a type of the serving cell is a predetermined type, determining to apply a signaled priority for the serving frequency indicated by the reselection priority indication.

The step of determining may further include, wherein if the UE does not receives the logged measurement configuration or the type of the serving cell is not the predetermined cell, determining to apply the implicit highest priority to the serving frequency.

If the signaled priority is applied to the serving frequency, the step of the measuring the inter-frequency may include: confirming whether the signaled priority of the inter-frequency is higher than the signaled priority of the serving frequency; performing a higher priority frequency measurement for the inter-frequency, if the signaled priority of the inter-frequency is higher than the signaled priority of the serving frequency; and performing an equal or lower frequency measurement for the inter-frequency, if the signaled priority of the inter-frequency is equal to or lower than the signaled priority of the serving frequency.

If the implicit highest priority is applied to the serving frequency, the step of the measuring the inter-frequency may include performing the equal or lower frequency measurement for the inter-frequency.

The method may further include: applying the implicit highest priority to the serving frequency for a cell reselection; and performing the cell reselection based on the implicit highest priority.

The predetermined type of the serving cell may be a member closed subscriber group (CSG) cell to which the UE is allowed to access.

The predetermined type of the serving cell may be a cell providing a multimedia broadcast and multicast service (MBMS) in which the UE is interested.

In another aspect, an apparatus operating in a wireless communication system is provided. The apparatus includes: a Radio Frequency (RF) unit transmits and receives radio signals; and a processor operatively coupled to the RF unit. The processor is configured for: camping on a serving cell operating on a serving frequency; receiving a reselection priority indication, the reselection priority indication indicating signaled priorities for the serving frequency and a inter-frequency; determining whether to apply an implicit highest priority to the serving frequency for measurement; and measuring the inter-frequency based on the signaled priorities.

Advantageous Effects of Invention

In case that a UE is camped on a predetermined cell, the measurement method according to the present invention can complement a problem that the network obtains a restricted measurement result needed for understanding a network circumstance and optimizing the network performance due to a restricted measurement of the UE. The network can obtain a measurement result of a non-serving frequency, and then provide the UE with a more optimized service. Furthermore, since the highest priority is applied to the serving frequency in a cell reselection process, the UE can maintain access to the serving cell of the predetermined type and receives an enhanced service.

MODE FOR THE INVENTION

Figure 1:
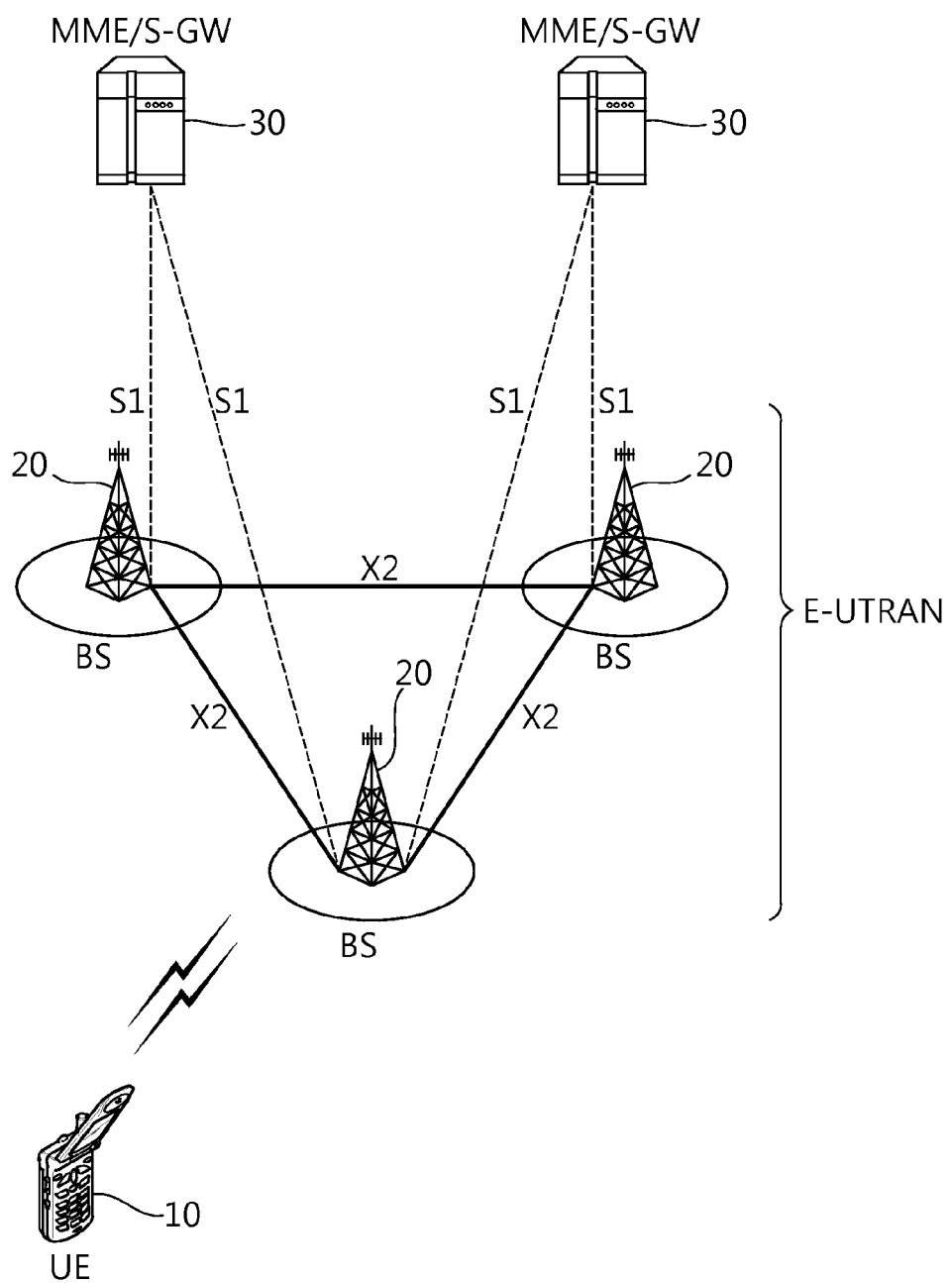
FIG. 1 illustrates a wireless communication system to which the present invention is applied.

FIG. 1 illustrates a wireless communication system to which the present invention is applied. The wireless communication system may also be referred to as an evolved-UMTS terrestrial radio access network (E-UTRAN) or a long term evolution (LTE)/LTE-A system.

The E-UTRAN includes at least one base station (BS) 20 which provides a control plane and a user plane to a user equipment (UE) 10. The UE 10 may be fixed or mobile, and may be referred to as another terminology, such as a mobile station (MS), a user terminal (UT), a subscriber station (SS), a mobile terminal (MT), a wireless device, etc. The BS 20 is generally a fixed station that communicates with the UE 10 and may be referred to as another terminology, such as an evolved node-B (eNB), a base transceiver system (BTS), an access point, etc.

The BSs 20 are interconnected by means of an X2 interface. The BSs 20 are also connected by means of an S1 interface to an evolved packet core (EPC) 30, more specifically, to a mobility management entity (MME) through S1-MME and to a serving gateway (S-GW) through S1-U.

The EPC 30 includes an MME, an S-GW, and a packet data network-gateway (P-GW). The MME has access information of the UE or capability information of the UE, and such information is generally used for mobility management of the UE. The S-GW is a gateway having an E-UTRAN as an end point. The P-GW is a gateway having a PDN as an end point.

Layers of a radio interface protocol between the UE and the network can be classified into a first layer (L1), a second layer (L2), and a third layer (L3) based on the lower three layers of the open system interconnection (OSI) model that is well-known in the communication system. Among them, a physical (PHY) layer belonging to the first layer provides an information transfer service by using a physical channel, and a radio resource control (RRC) layer belonging to the third layer serves to control a radio resource between the UE and the network. For this, the RRC layer exchanges an RRC message between the UE and the BS.

Figure 2:
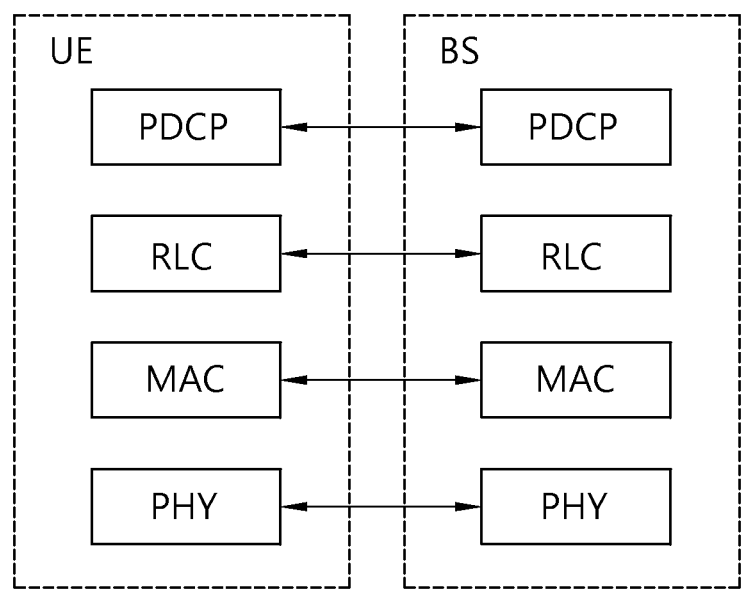
FIG. 2 is a diagram illustrating a radio protocol architecture for a user plane.
Figure 3:
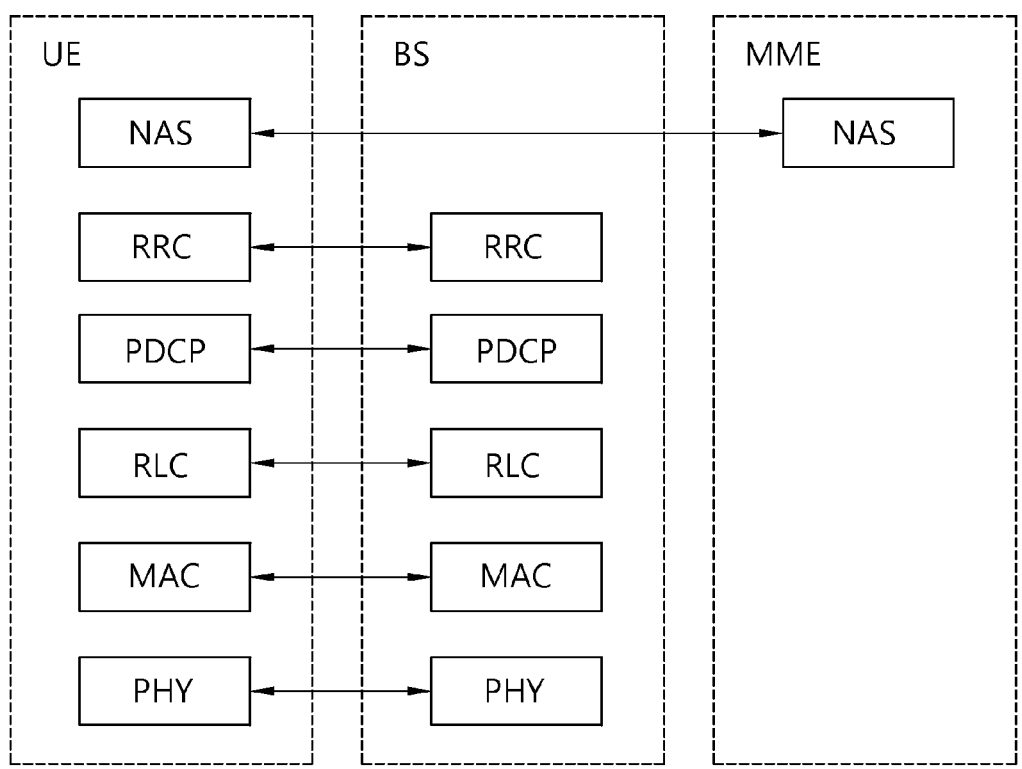
FIG. 3 is a diagram illustrating a radio protocol architecture for a control plane.

FIG. 2 is a diagram illustrating a radio protocol architecture for a user plane. FIG. 3 is a diagram illustrating a radio protocol architecture for a control plane. The user plane is a protocol stack for user data transmission. The control plane is a protocol stack for control signal transmission.

Referring to FIGS. 2 and 3, a PHY layer provides an upper layer with an information transfer service through a physical channel. The PHY layer is connected to a medium access control (MAC) layer which is an upper layer of the PHY layer through a transport channel. Data is transferred between the MAC layer and the PHY layer through the transport channel. The transport channel is classified according to how and with what characteristics data is transmitted through a radio interface.

Between different PHY layers, i.e., a PHY layer of a transmitter and a PHY layer of a receiver, data are transferred through the physical channel. The physical channel is modulated using an orthogonal frequency division multiplexing (OFDM) scheme, and utilizes time and frequency as a radio resource.

A function of the MAC layer includes mapping between a logical channel and a transport channel and multiplexing/de-multiplexing on a transport block provided to a physical channel over a transport channel of a MAC service data unit (SDU) belonging to the logical channel. The MAC layer provides a service to a radio link control (RLC) layer through the logical channel.

A function of the RLC layer includes RLC SDU concatenation, segmentation, and reassembly. To ensure a variety of quality of service (QoS) required by a radio bearer (RB), the RLC layer provides three operation modes, i.e., a transparent mode (TM), an unacknowledged mode (UM), and an acknowledged mode (AM). The AM RLC provides error correction by using an automatic repeat request (ARQ).

Functions of a packet data convergence protocol (PDCP) layer in the user plane include user data delivery, header compression, and ciphering. Functions of a PDCP layer in the control plane include control-plane data delivery and ciphering/integrity protection.

A radio resource control (RRC) layer is defined only in the control plane. The RRC layer serves to control the logical channel, the transport channel, and the physical channel in association with configuration, reconfiguration and release of radio bearers (RBs). An RB is a logical path provided by the first layer (i.e., PHY layer) and the second layer (i.e., MAC layer, RLC layer, and PDCP layer) for data delivery between the UE and the network.

The configuration of the RB implies a process for specifying a radio protocol layer and channel properties to provide a specific service and for determining respective detailed parameters and operations. The RB can be classified into two types, i.e., a signaling RB (SRB) and a data RB (DRB). The SRB is used as a path for transmitting an RRC message in the control plane. The DRB is used as a path for transmitting user data in the user plane.

When an RRC connection exists between an RRC layer of the UE and an RRC layer of the network, the UE is in an RRC connected state, and otherwise the UE is in an RRC idle state.

Data are transmitted from the network to the UE through a downlink transport channel. Examples of the downlink transport channel include a broadcast channel (BCH) for transmitting system information and a downlink-shared channel (SCH) for transmitting user traffic or control messages. The user traffic of downlink multicast or broadcast services or the control messages can be transmitted on the downlink-SCH or an additional downlink multicast channel (MCH). Data are transmitted from the UE to the network through an uplink transport channel. Examples of the uplink transport channel include a random access channel (RACH) for transmitting an initial control message and an uplink SCH for transmitting user traffic or control messages.

Examples of logical channels belonging to a higher channel of the transport channel and mapped onto the transport channels include a broadcast channel (BCCH), a paging control channel (PCCH), a common control channel (CCCH), a multicast control channel (MCCH), a multicast traffic channel (MTCH), etc.

The physical channel includes several symbols in a time domain and several sub-carriers in a frequency domain. One sub-frame includes a plurality of symbols in the time domain. One subframe includes a plurality of resource blocks. One resource block includes a plurality of symbols and a plurality of sub-carriers. Further, each subframe may use specific sub-carriers of specific symbols (e.g., a first symbol) of a corresponding subframe for a physical downlink control channel (PDCCH), i.e., an L1/L2 control channel. A transmission time interval (TTI) is a unit time of data transmission, and is 1 millisecond (ms) which corresponds to one subframe.

Hereinafter, an RRC state of a UE and an RRC connection will be disclosed.

The RRC state indicates whether an RRC layer of the UE is logically connected to an RRC layer of an E-UTRAN. If the two layers are connected to each other, it is called an RRC connected state, and if the two layers are not connected to each other, it is called an RRC idle state. When in the RRC connected state, the UE has an RRC connection and thus the E-UTRAN can recognize a presence of the UE in a cell unit. Accordingly, the UE can be effectively controlled. On the other hand, when in the RRC idle state, the UE cannot be recognized by the E-UTRAN, and is managed by a core network in a tracking area unit which is a unit of a wider area than a cell. That is, regarding the UE in the RRC idle state, only a presence or absence of the UE is recognized in a wide area unit. To get a typical mobile communication service such as voice or data, a transition to the RRC connected state is necessary.

When a user initially powers on the UE, the UE first searches for a proper cell and thereafter stays in the RRC idle state in the cell. Only when there is a need to establish an RRC connection, the UE staying in the RRC idle state establishes the RRC connection with the E-UTRAN through an RRC connection procedure and then transitions to the RRC connected state. Examples of a case where the UE in the RRC idle state needs to establish the RRC connection are various, such as a case where uplink data transmission is necessary due to telephony attempt of the user or the like or a case where a response message is transmitted in response to a paging message received from the E-UTRAN.

A non-access stratum (NAS) layer belongs to an upper layer of the RRC layer and serves to perform session management, mobility management, or the like.

To manage mobility of the UE in the NAS layer, two states are defined, i.e., an EPS mobility management-REGISTERED (EMM-REGISTERED) state and an EMM-DEREGISTERED state. These two states apply to the UE and the MME. Initially, the UE is in the EMM-DEREGISTERED state. To access a network, the UE performs a procedure of registering to the network through an initial attach procedure. If the attach procedure is successfully completed, the UE and the MME enter the EMM-REGISTERED state.

To manage a signaling connection between the UE and the EPC, two states are defined, i.e., an EPS connection management (ECM)-IDLE state and an ECM-CONNECTED state. These two states apply to the UE and the MME. When a UE in the ECM-IDLE state establishes an RRC connection with the E-UTRAN, the UE enters the ECM-CONNECTED state. When an MME in the ECM-IDLE state establishes an S1 connection with the E-UTRAN, the MME enters the ECM-CONNECTED state. When the UE is in the ECM-IDLE state, the E-UTRAN does not have context information of the UE. Therefore, the UE in the ECM-IDLE state performs a UE-based mobility related procedure such as cell selection or reselection without having to receive a command of the network. On the other hand, when the UE is in the ECM-CONNECTED state, mobility of the UE is managed by the command of the network. If a location of the UE in the ECM-IDLE state becomes different from a location known to the network, the UE reports the location of the UE to the network through a tracking area update procedure.

Next, system information will be disclosed.

The system information includes essential information that needs to be known to a UE to access a BS. Thus, the UE has to receive all system information before accessing the BS. Further, the UE always has to have the latest system information. Since the system information is information that must be known to all UEs in one cell, the BS periodically transmits the system information.

According to the section 5.2.2 of 3GPP TS 36.331 V8.7.0 (2009-09) "Radio Resource Control (RRC); Protocol specification (Release 8)", the system information is classified into a master information block (MIB), a scheduled block (SB), and a system information block (SIB). The MIB allows the UE to know a physical configuration (e.g., bandwidth) of a specific cell. The SB reports transmission information (e.g., a transmission period or the like) of SIBs. The SIB is a group of a plurality of pieces of system information related to each other. For example, an SIB includes only information of a neighboring cell, and another SIB includes only information of an uplink radio channel used by the UE.

In general, a service provided by the network to the UE can be classified into three types to be described below. Further, according to which service can be provided, the UE recognizes a cell type differently. A service type will be first described below, and then the cell type will be described.

1) Limited service: This service provides an emergency call and an earthquake and tsunami warning system (ETWS), and can be provided in an acceptable cell.

2) Normal service: This service denotes a public use service for general use, and can be provided in a suitable or normal cell.

3) Operator service: This service denotes a service for a network service provider, and a cell can be used only by the network service provider and cannot be used by a normal user.

A service type provided by a cell can be identified as follows.

1) Acceptable cell: A UE can receive a limited service in this cell. This cell is not barred from the perspective of the UE, and satisfies a cell selection criterion of the UE.

2) Suitable cell: The UE can receive a regular service in this cell. This cell satisfies a condition of an acceptable cell, and also satisfies additional conditions. Regarding the additional conditions, this cell has to belong to a PLMN to which the UE can access, and a tracking area update procedure of the UE must not be barred in this cell. If a specific cell is a CSG cell, this cell must be accessible by the UE as a CSG member.

3) Barred cell: Information indicating that a cell is a barred cell is broadcast in this cell by using system information.

4) Reserved cell: Information indicating that a cell is a reserved cell is broadcast in this cell by using system information.

Figure 4:
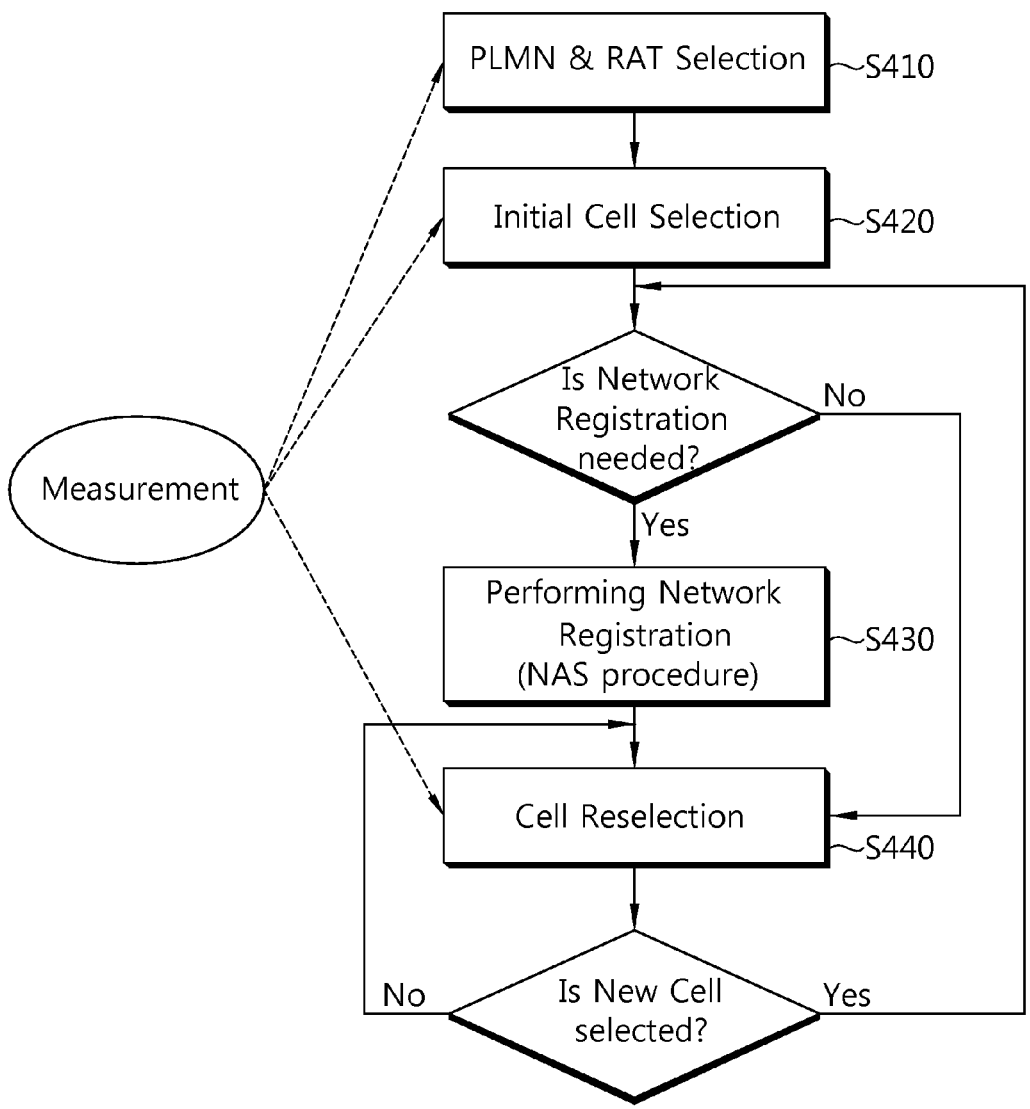
FIG. 4 is a flow chart illustrating an operation of a UE in an RRC idle state.

FIG. 4 is a flow chart illustrating an operation of a UE in an RRC idle state. Specifically, FIG. 4 shows a procedure in which a UE is registered to a network through a cell selection process when power of the UE is turned on, and a cell re-selection is performed when necessary.

Referring to FIG. 4, the UE selects a radio access technology (RAT) for communicating with a PLMN (public land mobile network) as a network the UE wants to receive a service therefrom (S410). Information regarding the and RAT may be selected by a user of the UE, or that stored in a USIM (universal subscriber identity module) may be used.

The UE selects a cell having the greatest value among cells in which signal strength or quality thereof is greater than a particular value (S420). This is performed by a UE as power thereof is turned on, which may be called an initial cell selection. The cell selection procedure will be described later. After the cell selection, the UE receives system information periodically transmitted by a BS. The particular value refers to a value defined in the system in order to guarantee quality of a physical signal in data transmission and reception. Thus, it may vary according to an applied RAT.

When a network registration is required, the UE performs a network registration procedure (S430). In order to receive a service (e.g., paging) from the network, the UE registers its information (e.g., an IMSI). The UE is not registered to a network whenever a cell is selected, and registered to a network when information (e.g., tracking area identity (TAI)) of a network received from the system information and information of a network the UE knows are different.

The UE performs cell re-selection based on a service environment provided in a cell, a terminal environment, or the like (S440). When signal strength or quality value measured from a BS serving the UE is lower than a value measured from a BS of an adjacent cell, the UE selects one of cells providing better signal characteristics than that of the cell of the BS the UE has accessed. This process is called a cell re-selection, discriminated from initial cell selection performed twice. Here, in order to prevent a cell is frequently re-selected according to a change in signal characteristics, a temporal constraint is provided. The cell re-selection procedure will be described later.

Figure 5:
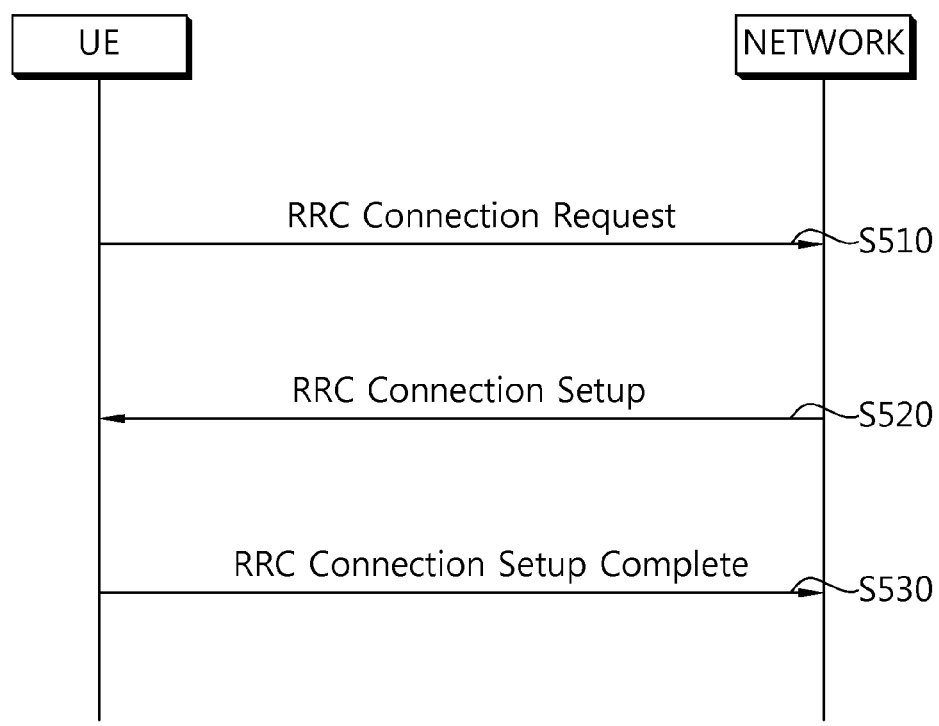
FIG. 5 is a flowchart showing an RRC connection establishment procedure.

FIG. 5 is a flowchart showing an RRC connection establishment procedure.

A UE sends to a network an RRC connection request message for requesting an RRC connection (step S510). The network sends an RRC connection setup message in response to the RRC connection request (step S520). After receiving the RRC connection setup message, the UE enters an RRC connection mode.

The UE sends to the network an RRC connection setup complete message used to confirm successful completion of the RRC connection establishment (step S530).

Figure 6:
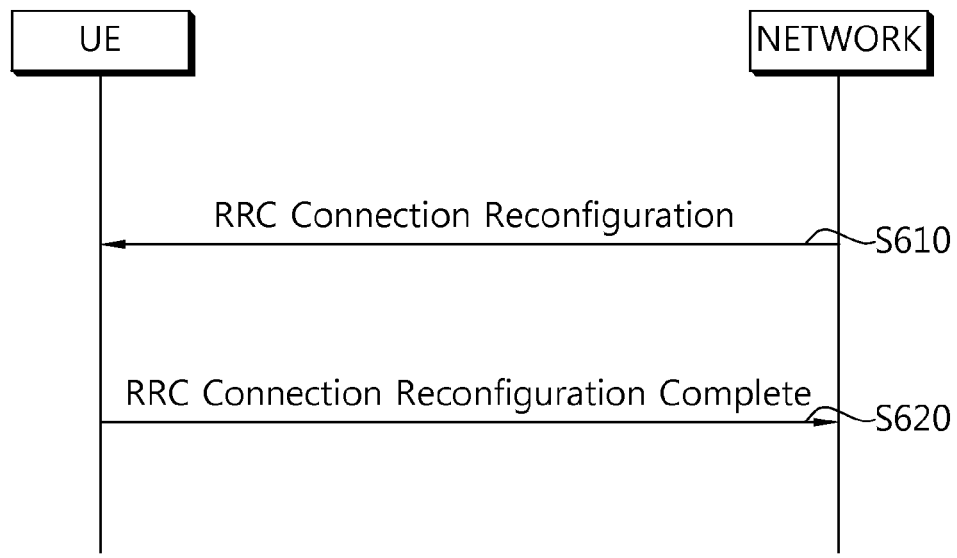
FIG. 6 is a flowchart showing an RRC connection reconfiguration procedure.

FIG. 6 is a flowchart showing an RRC connection reconfiguration procedure. An RRC connection reconfiguration is used to modify an RRC connection. This is used to establish/modify/release an RB, to perform a handover, and to set up/modify/release a measurement.

A network sends to a UE an RRC connection reconfiguration message for modifying the RRC connection (step S610). In response to the RRC connection reconfiguration, the UE sends to the network an RRC connection reconfiguration complete message used to confirm successful completion of the RRC connection reconfiguration (step S620).

Next, a procedure for selecting a cell by the UE will be described in detail.

If the UE is turned on or is camped on a cell, the UE may perform procedures for selecting/reselecting a cell having suitable quality in order to receive a service.

The UE in an RRC idle state needs to be ready to receive the service through the cell by selecting the cell having suitable quality all the time. For example, the UE that has been just turned on must select the cell having suitable quality so as to be registered into a network. If the UE that has stayed in an RRC connected state enters into the RRC idle state, the UE must select a cell on which the UE itself is camped. As such, a process of selecting a cell satisfying a certain condition by the UE in order to stay in a service waiting state such as the RRC idle state is called a cell selection. The cell selection is performed in a state that the UE does not currently determine a cell on which the UE itself is camped in the RRC idle state, and thus it is very important to select the cell as quickly as possible. Therefore, if a cell provides radio signal quality greater than or equal to a predetermined level, the cell may be selected in the cell selection process of the UE even though the cell is not a cell providing best radio signal quality.

Hereinafter, by referring to the 3GPP TS 36.304 V8.5.0 (2009-03) "User Equipment (UE) procedures in idle mode (Release 8)", a method and procedure for selecting a cell by a UE in 3GPP LTE will be described in detail.

If power is initially turned on, the UE searches for available PLMNs and selects a suitable PLMN to receive a service. Subsequently, the UE selects a cell having a signal quality and property capable of receiving a suitable service among the cells provided by the selected PLMN.

The cell selection process can be classified into two processes.

One process is an initial cell selection process, and in this process, the UE does not have previous information on radio channels. Therefore, the UE searches for all radio channels to find a suitable cell. In each channel, the UE searches for the strongest cell. Subsequently, if a suitable cell satisfying cell selection criteria is found, the UE selects the cell.

After the UE selects a certain cell through a cell selection process, the signal strength and quality between the UE and the BS may be changed due to the change of the UE mobility and wireless environment. Therefore, if the quality of the selected cell deteriorates, the UE may select another cell providing better quality. If a cell is reselected in this manner, a cell providing signal quality better than that of the currently selected cell is selected in general. This process is called a cell reselection. A basic purpose of the cell reselection process is generally to select a cell providing best quality to the UE from the perspective of the radio signal quality.

In addition to the perspective of the radio signal quality, the network may notify the UE of a priority determined for each frequency. The UE that has received the priority may consider this priority more preferentially than the radio signal quality criteria during the cell reselection process.

As described above, there is a method of selecting or reselecting a cell based on the signal property of the wireless environment. When a cell is selected for reselection in the cell reselection process, there may be cell reselection methods as described below, based on the RAT and frequency characteristics of the cell.

Intra-frequency cell reselection: A reselected cell is a cell having the same center-frequency and the same RAT as those used in a cell on which the UE is currently being camped.

Inter-frequency cell reselection: A reselected cell is a cell having the same RAT and a different center-frequency with respect to those used in the cell on which the UE is currently being camped.

Inter-RAT cell reselection: A reselected cell is a cell using a different RAT from a RAT used in the cell on which the UE is currently being camped.

The principles of the cell reselection process are as follows.

First, the UE measures quality of a serving cell and a neighboring cell for a cell reselection.

Second, the cell reselection is performed based on cell reselection criteria. The cell reselection criteria have following characteristics with regard to the measurement of serving cells and neighboring cells.

The intra-frequency cell reselection is basically based on ranking. The ranking is an operation for defining a criterion value for evaluation of the cell reselection and for ordering cells according to a magnitude of the criterion value by using the criterion value. A cell having the highest criterion is referred to as a best-ranked cell. The cell criterion value is a value to which a frequency offset or a cell offset is optionally applied on the basis of a value measured by the UE for a corresponding cell.

The inter-frequency cell reselection is based on a frequency priority provided by the network. The UE attempts to camp on at a frequency having a top priority. The network may provide the same frequency priority to be commonly applied to UEs in a cell by using broadcast signaling or may provide a frequency-specific priority to each UE by using dedicated signaling for each UE.

For the inter-frequency cell reselection, the network may provide parameters (e.g., frequency-specific offsets) for use in cell reselection to the UE for each frequency.

For the intra-frequency cell reselection or the inter-frequency cell reselection, the network may provide a neighboring cell list (NCL) for use in the cell reselection to the UE. The NCL includes cell-specific parameters (e.g. cell-specific offsets) used in the cell reselection.

For the intra-frequency or inter-frequency cell reselection, the network may provide the UE with a black list, i.e., a list of cells not to be selected in the cell reselection. The UE does not perform the cell reselection on cells included in the black list.

Now, the ranking used in a cell reselection evaluation process will be described.

A ranking criterion used to assign a priority to a cell is defined by Equation 1 below.

$$R_S = Q_{meas,s} + Q_{hyst}, R_n = Q_{means,n} - Q_{offset} \quad [\text{Math.1}]$$

Herein, Rs denotes a ranking value of a serving cell, Rn denotes a ranking criterion of a neighboring cell, Qmeas,s denotes a quality value measured for the serving cell by the UE, Qmeas,n denotes a quality value measured for the neighboring cell by the UE, Qhyst denotes a hysteresis value for ranking, and Qoffset denotes an offset between two cells.

In the intra-frequency cell reselection, if the UE receives an offset Qoffsets,n between the serving cell and the neighboring cell, Qffoset=Qoffsets,n. Otherwise, Qffoset=0.

In the inter-frequency cell reselection, if the UE receives the offset Qoffsets,n, Qoffset=Qoffsets,n+Qfrequency. Otherwise, Qoffset=Qfrequency.

If the ranking criterion Rs of the serving cell and the ranking criterion Rn of the neighboring cell are not much different from each other and constantly vary, ranking orders of the serving cell and the neighboring cell may change frequently. Thus, the serving cell and the neighboring cell may be reselected alternately while changing their ranking orders frequently. In order to prevent the UE from reselecting two cells alternately, the hysteresis value Qhyst is used to give a hysteresis in the cell reselection.

The UE measures the ranking criterion Rs of the serving cell and the ranking criterion Rn of the neighboring cell according to the above equation. A cell having the greatest ranking criterion value is reselected by considering this cell as a best-ranked cell.

In the above-mentioned cell reselection criterion, the quality of cells is considered as a most important factor when performing the cell reselection. If a reselected cell is not a suitable cell, the UE excludes the reselected cell or a frequency of the reselected cell from targets of the cell reselection.

The following description is related to measurement and measurement report.

It is necessary for a mobile communication system to support mobility of a UE. Therefore, the UE persistently measures quality of a serving cell providing a current service and quality of a neighboring cell. The UE reports a measurement result to a network at a proper time. The network provides optimal mobility to the UE by using a handover or the like.

To provide information which can be helpful for a network operation of a service provider in addition to the purpose of supporting the mobility, the UE may perform measurement with a specific purpose determined by the network, and may report the measurement result to the network. For example, the UE receives broadcast information of a specific cell determined by the network. The UE may report to a serving cell a cell identify (also referred to as a global cell identity) of the specific cell, location identification information indicating a location of the specific cell (e.g., a tracking area code), and/or other cell information (e.g., whether it is a member of a closed subscriber group (CSG) cell).

In a state of moving, if the UE determines that quality of a specific region is significantly bad, the UE may report a measurement result and location information on cells with bad quality to the network. The network may attempt to optimize the network on the basis of the measurement result reported from UEs which assist the network operation.

In a mobile communication system having a frequency reuse factor of 1, mobility is generally supported between different cells existing in the same frequency band. Therefore, in order to properly guarantee the UE mobility, the UE has to properly measure cell information and quality of neighboring cells having the same center frequency as a center frequency of a serving cell. Measurement on a cell having the same center frequency as the center frequency of the serving cell is referred to as intra-frequency measurement. The UE performs the intra-frequency measurement and reports a measurement result to the network, so as to achieve the purpose of the measurement result.

A mobile communication service provider may perform a network operation by using a plurality of frequency bands. If a service of a communication system is provided by using the plurality of frequency bands, optimal mobility can be guaranteed to the UE when the UE is able to properly measure cell information and quality of neighboring cells having a different center frequency from the center frequency of the serving cell. Measurement on a cell having the different center frequency from the center frequency of the serving cell is referred to as inter-frequency measurement. The UE has to be able to perform the inter-frequency measurement and report a measurement result to the network.

When the UE supports measurement on a heterogeneous network, measurement on a cell of the heterogeneous network may be performed according to a configuration of a BS. Such a measurement on the heterogeneous network is referred to as inter-radio access technology (RAT) measurement. For example, RAT may include a GMS EDGE radio access network (GERAN) and a UMTS terrestrial radio access network (UTRAN) conforming to the 3GPP standard, and may also include a CDMA 200 system conforming to the 3GPP2 standard.

Figure 7:
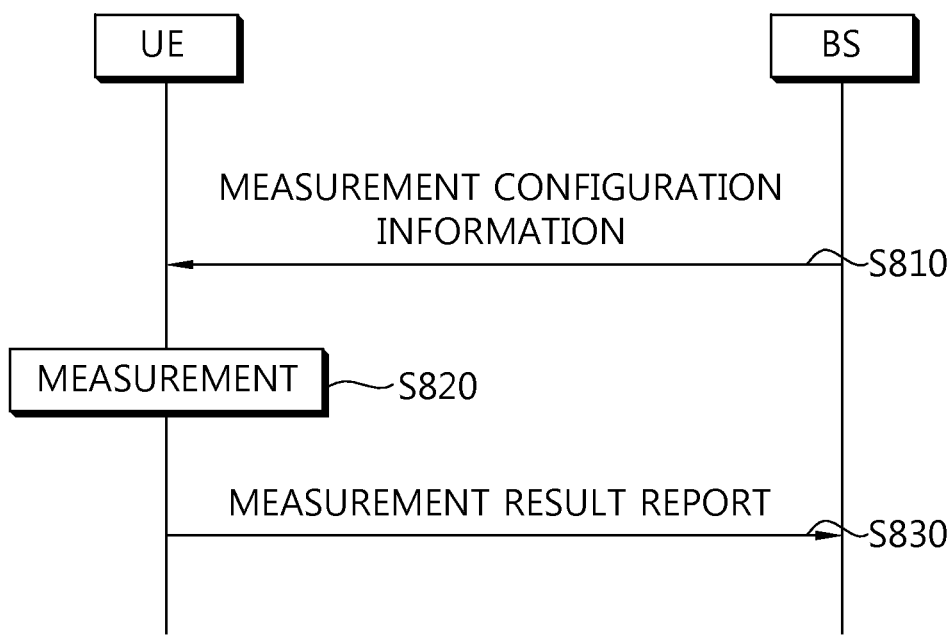
FIG. 7 is a flowchart showing a conventional method of performing measurement.

FIG. 7 is a flowchart showing a conventional method of performing measurement.

A UE receives measurement configuration information from a BS (step S710). A message including the measurement configuration information is referred to as a measurement configuration message. The UE performs measurement based on the measurement configuration information (step S720). If a measurement result satisfies a reporting condition included in the measurement configuration information, the UE reports the measurement result to the BS (step S730). A message including the measurement result is referred to as a measurement report message.

The measurement configuration information may include the following information.

(1) Measurement object: The object is on which the UE performs the measurements. The measurement object includes at least one of an intra-frequency measurement object which is an object of intra-frequency measurement, an inter-frequency measurement object which is an object of inter-frequency measurement, and an inter-RAT measurement object which is an object of inter-RAT measurement. For example, the intra-frequency measurement object may indicate a neighboring cell having the same frequency as a frequency of a serving cell, the inter-frequency measurement object may indicate a neighboring cell having a different frequency from a frequency of the serving cell, and the inter-RAT measurement object may indicate a neighboring cell of a different RAT from an RAT of the serving cell.

(2) Reporting configuration: This includes a reporting criterion and a reporting format. The reporting criterion is used to trigger the UE to send a measurement report and can either be periodical or a single event description. The reporting format is a quantity that the UE includes in the measurement report and associated information (e.g. number of cells to report).

(3) Measurement identity: Each measurement identity links one measurement object with one reporting configuration. By configuring multiple measurement identities, it is possible to link more than one measurement object to the same reporting configuration, as well as to link more than one reporting configuration to the same measurement object. The measurement identity is used as a reference number in the measurement report. The measurement identify may be included in the measurement report to indicate a specific measurement object for which the measurement result is obtained and a specific reporting condition according to which the measurement report is triggered.

(4) Quantity configuration: One quantity configuration is configured per RAT type. The quantity configuration defines the measurement quantities and associated filtering used for all event evaluation and related reporting of that measurement type. One filter can be configured per measurement quantity.

(5) Measurement gaps: Measurement gaps are periods that the UE may use to perform measurements when downlink transmission and uplink transmission are not scheduled.

To perform a measurement procedure, the UE has a measurement object, a reporting configuration, and a measurement identity.

In 3GPP LTE, the BS can assign only one measurement object to the UE with respect to one frequency. Events for triggering measurement reporting shown in the table below are defined in the section 5.5.4 of 3GPP TS 36.331 V8.5.0 (2009-03) "Evolved Universal Terrestrial Radio Access (E-UTRA) Radio Resource Control (RRC); Protocol specification (Release 8)".

TABLE 1

| Events | Reporting Condition |
|---|---|
| Event A1 | Serving becomes better than threshold |
| Event A2 | Serving becomes worse than threshold |
| Event A3 | Neighbor becomes offset better than serving |
| Event A4 | Neighbor becomes better than threshold |
| Event A5 | Serving becomes worse than threshold1 and neighbor becomes better than threshold2 |
| Event B1 | Inter RAT neighbor becomes better than threshold |
| Event B2 | Serving becomes worse than threshold1 and inter RAT neighbor becomes better than threshold2 |

If the measurement result of the UE satisfies the determined event, the UE transmits a measurement report message to the BS.

Figure 8:
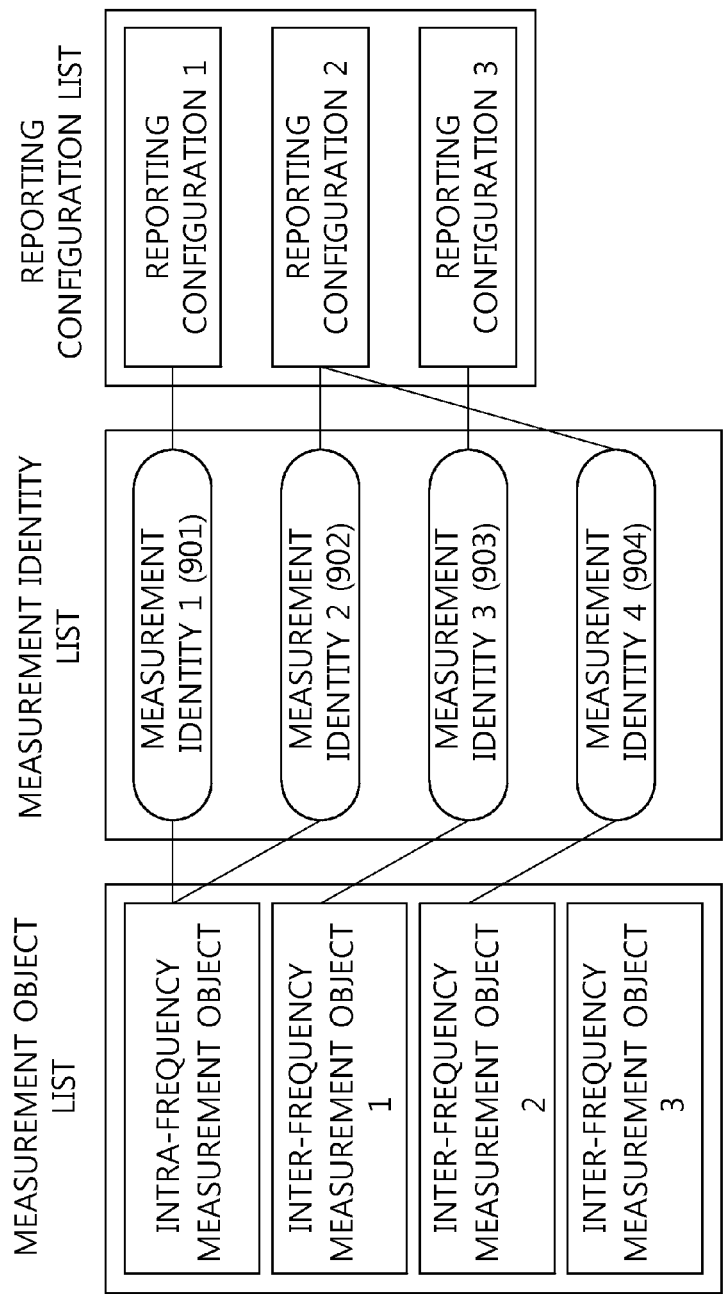
FIG. 8 shows an example of a measurement configuration assigned to a UE.

FIG. 8 shows an example of a measurement configuration assigned to a UE.

First, a measurement identity1 801 associates an intra-frequency measurement object with a reporting configuration 1. The UE performs intra-frequency measurement. The reporting configuration 1 is used to determine a reporting type and a criterion for reporting a measurement result.

A measurement identity 2 802 is associated with the intra-frequency measurement object similarly to the measurement identifier1 801, and associates the intra-frequency measurement object with a reporting configuration 2. The UE performs intra-frequency measurement. The reporting configuration 2 is used to determine a reporting format and a criterion for reporting a measurement result.

By using the measurement identity1 801 and the measurement identity2 802, the UE transmits a measurement result even if the measurement result on the intra-frequency measurement object satisfies any one of the reporting configuration 1 and the reporting configuration 2.

A measurement identity3 803 associates an inter-frequency measurement object 1 with a reporting configuration 3. When a measurement result on the inter-frequency measurement object 1 satisfies a reporting criterion included in the reporting configuration 1, the UE reports the measurement result.

A measurement identity4 804 associates an inter-frequency measurement object 2 with the reporting configuration 2. When a measurement result on the inter-frequency measurement object 2 satisfies a reporting criterion included in the reporting configuration 2, the UE reports the measurement result.

Meanwhile, the measurement object, the reporting configuration, and/or the measurement identity can be added, modified, and/or deleted. To instruct such operations, the BS may transmit to the UE a new measurement configuration message or a measurement configuration modification message.

Figure 9:
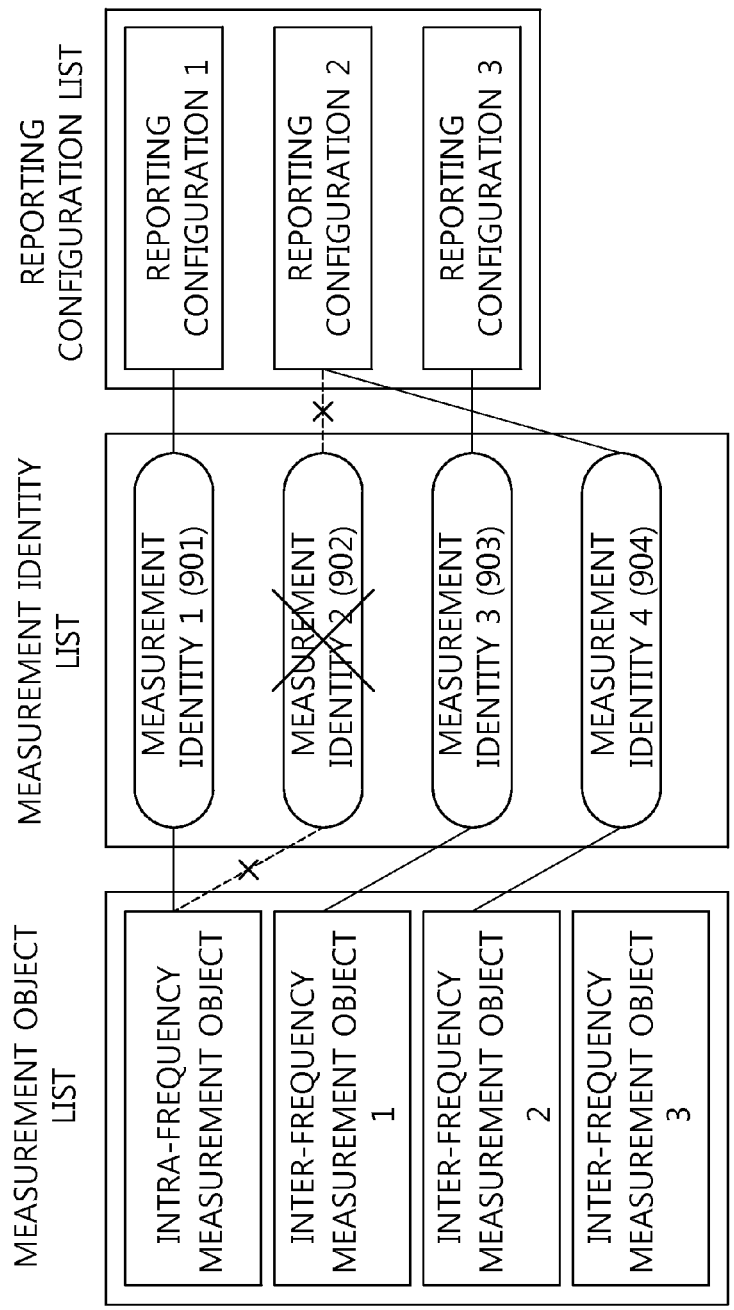
FIG. 9 shows an example of deleting a measurement identity.

FIG. 9 shows an example of deleting a measurement identity. When a measurement identity2 802 is deleted, measurement on a measurement object associated with the measurement identity2 802 is suspended, and a measurement report is not transmitted. A reporting configuration or a measurement object associated with the deleted measurement identity may not be modified.

Figure 10:
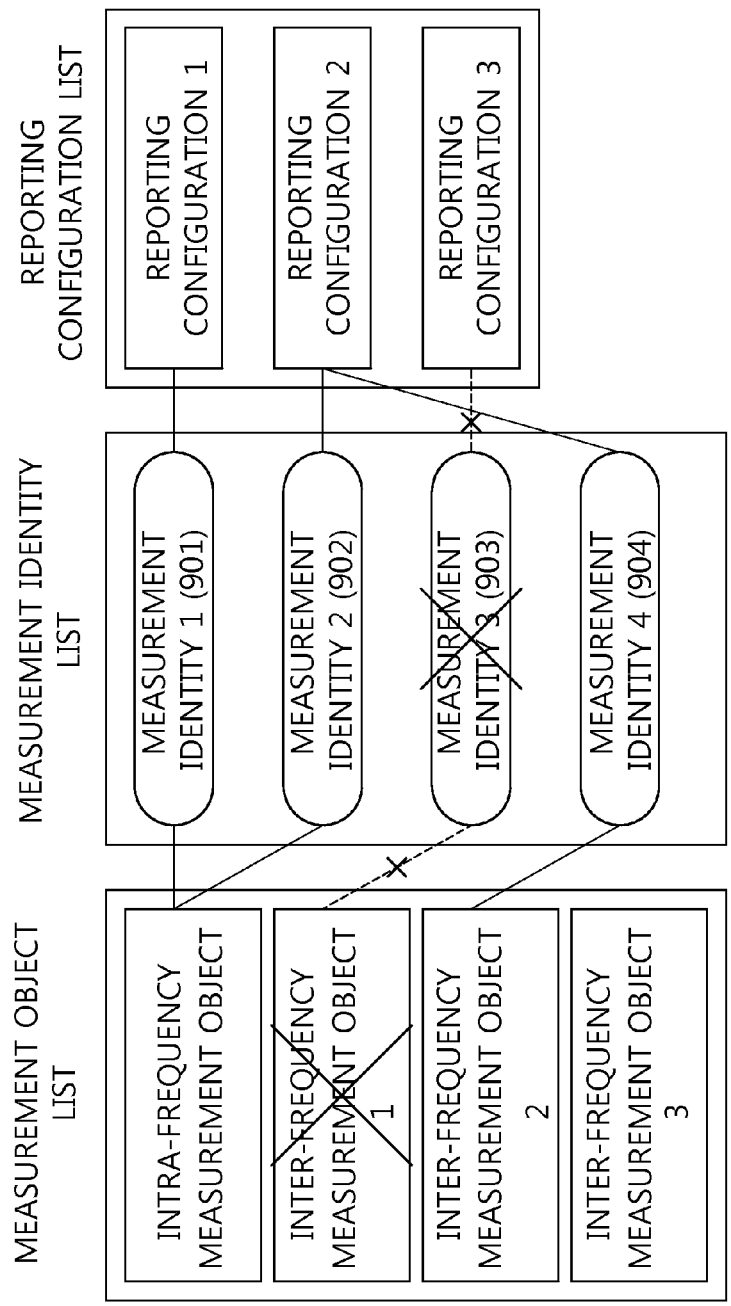
FIG. 10 shows an example of deleting a measurement object.

FIG. 10 shows an example of deleting a measurement object. When an interfrequency measurement object 1 is deleted, a UE also deletes an associated measurement identifier3 803. Measurement on the inter-frequency measurement object 1 is suspended, and a measurement report is not transmitted. However, a reporting configuration associated with the deleted inter-frequency measurement object 1 may not be modified or deleted.

When the reporting configuration is deleted, the UE also deletes an associated measurement identifier. The UE suspends measurement on an associated measurement object according to the associated measurement identifier. Measurement on the measurement object and measurement reporting are suspended. However, a measurement object associated with the deleted reporting configuration may not be modified or deleted.

A measurement procedure performed by a UE in RRC Idle state will be described below.

The UE performs a measurement on intra-frequency and/or inter-frequency for cell selection and/or cell reselection. At this time, a measurement performance and a measurement requirement vary depending on a reselection priority of a measuring frequency. According to whether a reselection priority of inter-frequency to be measured is lower or higher than a reselection priority of the inter-frequency, inter-frequency may be performed by the UE as follow.

Higher priority frequency measurement: For an E-UTRAN inter-frequency or inter-RAT frequency with a reselection priority higher than the reselection priority of the current E-UTRAN frequency, the UE shall perform measurements of higher priority E-UTRAN inter-frequency or inter-RAT frequencies. The measurements on higher priority frequency are called "Higher priority frequency measurements' in the below description.

Equal or Lower priority frequency measurements: For an E-UTRAN inter-frequency with an equal or lower reselection priority than the reselection priority of the current E-UTRAN frequency and for inter-RAT frequency with lower reselection priority than the reselection priority of the current E-UTRAN frequency:

If the measured RSRP of serving cell is higher than the RSRP threshold for inter-frequency measurements (SnonIntraSearchP) and measured RSRQ of serving cell is higher than the RSRQ threshold for inter-frequency measurements, the UE may choose not to perform measurements of E-UTRAN inter-frequencies or inter-RAT frequency cells of equal or lower priority.

Otherwise, the UE shall perform measurements of E-UTRAN inter-frequencies or inter-RAT frequency cells of equal or lower priority.

The measurements on equal or lower priority frequency are called 'equal or lower priority frequency measurements' in the below description.

Note that in general the measurement requirements for higher priority frequency measurements are stricter than those of equal or lower priority frequency measurements.

A Public Land Mobile Network (PLMN) is a network deployed and operated by mobile network operator(s). Each mobile network operator runs one or more PLMNs. Each PLMN can be identified with the Mobile Country Code (MCC) and the Mobile Network Code (MNC). The PLMN information of a cell is broadcast in the system information.

For PLMN selection, cell selection, and cell reselection, several types of PLMNs are considered by UE.

Home PLMN (HPLMN): The PLMN whose MCC and the MNC matches the MCC and the MNC of the UE's IMSI.

Equivalent HPLMN (EHPLMN): Any PLMN that is equivalent to HPLMN.

Registered PLMN (RPLMN): The PLMN for which location registration is successful.

Equivalent PLMN (EPLMN): Any PLMN that is equivalent to RPLMN.

Each mobile service subscriber has a subscription with a HPLMN. When the normal service is provided to UE by the HPLMN or the EHPLMN, the UE is not in a roaming state. On the other hand, when the service is provided to UE by the PLMN other than HPLMN/EPHPLN, the UE is in a roaming state, and the PLMN is called Visited PLMN (VPLMN).

When UE is powered on, PLMN selection is triggered. For the selected PLMN, UE attempts to register the selected PLMN. If the registration is successful, the selected PLMN becomes RPLMN. Network can signal to the UE a list of PLMN for which the UE considers those PLMNs in the PLMN list equivalent to its RPLMN. The PLMN equivalent to RPLMN is called EPLMN. The UE that registered with network should be reachable by the network at any time. If the UE is in ECM-CONNECTED (equivalently RRC_CONNECTED), the network is aware of the cell the UE is being served. However, while the UE is in ECM-IDLE (equivalently RRC_IDLE), the context of the UE is not available at the eNB but stored in the MME. In this case, the location of the UE in ECM-IDLE is only known to the MME at the granularity of a list of Tracking Area (TA)s. A single TA is identified by the Tracking Area Identity (TAI) which consists of the PLMN Identity the tracking area belongs to and the Tracking Area Code (TAC) that uniquely represents the TA in the PLMN.

The following description is about an H(e)NB.

In addition to a mobile network vendor, a mobile communication service can be provided via an eNB of an individual user or a specific vendor or a group owner. Such an eNB is called a home node B (HNB) or a home eNB (HeNB). Hereinafter, both the HNB and HeNB are collectively referred to as the HeNB. The HeNB is basically used to provide specialized services only to members of a closed subscriber group (CSG). However, according to operation mode setting of the HeNB, the services may also be provided to other users in addition to the users of the CSG.

Figure 11:
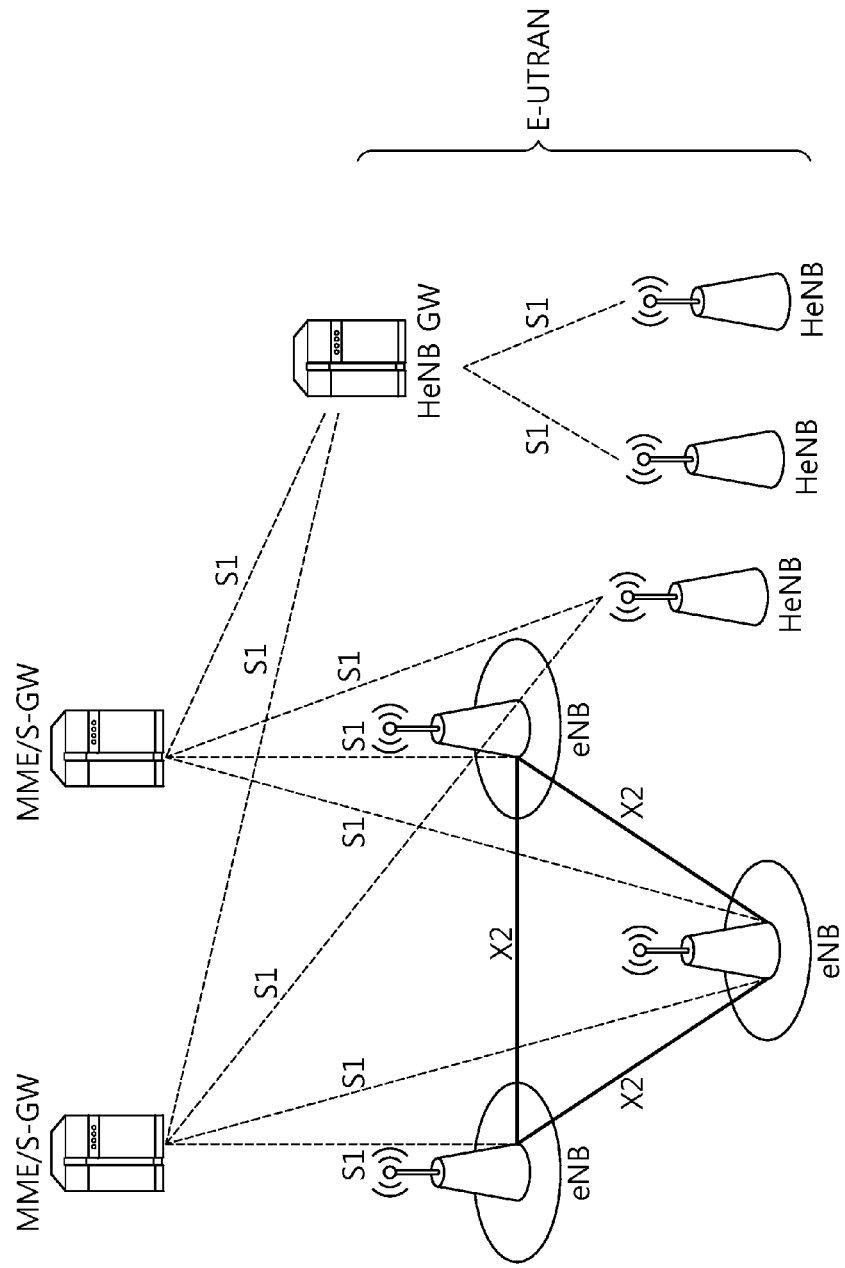
FIG. 11 shows an example of a wireless communication system for operating a HeNB.

FIG. 11 shows an example of a wireless communication system for operating a HeNB.

Referring to FIG. 11, a home eNB gateway (HeNB GW) can be operated to provide a service to the HeNB as described above. HeNBs are connected to an EPC directly or via the HeNB GW. An MME regards the HeNB GW as a typical eNB. Further, the HeNB regards the HeNB GW as the MME. Therefore, the HeNB and the HeNB GW are connected by means of an S1 interface, and also the HeNB GW and the EPC are connected by means of the S1 interface. Furthermore, even in a case where the HeNB and the EPC are directly connected, they are connected by means of the S1 interface. A function of the HeNB is almost similar to a function of the typical eNB.

In general, the HeNB has radio transmission output power lower than that of an eNB owned by a mobile network vendor. Therefore, in general, the coverage provided by the HeNB is smaller than the coverage provided by the eNB. Due to such characteristics, a cell provided by the HeNB is often classified as a femto cell in contrast to a macro cell provided by the eNB from the perspective of the coverage. Meanwhile, from the perspective of provided services, when the HeNB provides the services only to the CSG group, a cell provided by this HeNB is referred to as a CSG cell.

Each CSG has its own identity which is called a CSG identity (CSG ID). The UE may have a list of CSGs to which the UE belongs as a member thereof, and this CSG list may be referred as a CSG white list. The CSG white list may change by a request of the UE or by a command of the network. In general, one HeNB can support one CSG.

The HeNB delivers the CSG ID of the CSG supported by the HNB itself by using system information, so as to allow access of only a member UE of the corresponding CSG. When the CSG cell is found, the UE may read the CSG ID included in the system information to determine which CSG is supported by the CSG cell. The UE that has read the CSG ID regards the corresponding cell as an accessible cell only if the UE itself is a member of the corresponding CSG cell.

It is not always required for the HeNB to allow access of the CSG UE. Based on the configuration setting of the HeNB, access of a non-CSG member UE may also be allowed. According to the configuration setting of the HeNB, access is allowed for a different UE. Herein, the configuration setting denotes setting of an operation mode of the HeNB. The operation mode of the HeNB is classified into three modes described below, depending on a type of UE for which a service is provided.

1) Closed access mode: A mode in which services are provided to particular CSG members only. The HeNB provides a CSG cell.

2) Open access mode: A mode in which services are provided without any restriction of particular CSG members, similarly to the typical eNB. The HeNB provides a typical cell instead of a CSG cell.

3) Hybrid access mode: A mode in which CSG services are provided to particular CSG members and also services are provided to non-CSG members, similarly to a typical cell. It is recognized as a CSG cell for the CSG member UE, and recognized as a typical cell for the non-CSG member UE. This cell is called a hybrid cell.

The HeNB notifies to the UE whether a cell serviced by the HeNB is a CSG cell or a typical cell, and thus allows the UE to know whether the UE can access to the cell. When operating in the closed access mode, the HeNB broadcasts that the cell serviced by the HeNB is the CSG cell by using system information. When operating in the open access mode, the HeNB broadcasts that the cell serviced by the HeNB is not the CSG cell by using the system information. In this manner, the HeNB inserts a CSG indicator into the system information, wherein the CSG indicator indicates whether the cell being serviced by the HeNB is the CSG cell or not. For example, the CSG cell broadcasts the CSG indicator by setting it to 'TRUE'. If the cell being serviced is not the CSG cell, a method of setting the CSG indicator to 'FALSE' or omitting transmission of the CSG indicator may be used. Since the UE has to distinguish the CSG cell provided by the eNB from the typical cell, the typical eNB may also transmit the CSG indicator so as to allow the UE to know that the cell type provided by the eNB is the typical cell. The typical eNB may allow the UE to know that the cell type provided by the eNB is the typical cell by not transmitting the CSG indicator. The CSG-related parameters transmitted by the corresponding cell for each cell type are represented in Table 2. Subsequently, a type of UE for which access is accepted is represented in Table 3.

TABLE 2

|  | CSG Cell | Typical Cell |
| --- | --- | --- |
| CSG Indicator | 'CSG Cell' is indicated | 'Non-CSG cell' is indicated, or not transmitted |
| CSG ID | Supported CSG ID is transmitted | Not transmitted |

TABLE 3

|  | CSG Cell | Typical Cell |
| --- | --- | --- |
| UE not supporting CSG | Access denied | Access accepted |
| Non-CSG member UE | Access denied | Access accepted |
| CSG member UE | Access accepted | Access accepted |

Next, a cell re-selection process in relation to a CSG cell will be described. The CSG cell is a cell for providing a better service to a corresponding CSG member UE. Thus, when the UE is camped on in the CSG cell, it may not be desirous in terms of quality of service (QoS) if the UE discovers an inter-frequency having frequency priority higher than that of a serving frequency and re-selects a cell of the inter-frequency, So, when the UE is camping on a suitable CSG cell, the UE may assume that the highest priority is allocated to the current frequency instead of allocating other priorities to the current frequency. In this manner, the highest priority may be applied to the serving frequency by the UE camping on the CSG cell regardless of a frequency priority signaled by a network, and this process may be referred as implicit highest priority assumption. If the UE camped on the CSG cell reselects a non-CSG cell on the same frequency, the UE withdraw the assumption and uses the priority signaled by the network in a cell reselection evaluation.

If the UE detects one or more CSG cell on other frequency and a considered CSG cell is a best ranked cell on the frequency, the UE reselects a cell among the one or more CSG cell regardless of a frequency priority of a cell on which the UE is camping. If the UE detects a suitable cell on the same frequency, the UE reselects the cell in accordance with normal cell reselection criteria.

If a different CSG cell best linked in a frequency having the same frequency priority is discovered when the UE is camped on in the CSG cell, whether the UE re-selects the CSG cell or whether the UE remains in the CSG cell in which it is currently camped on follows an implementation of the UE.

From UE perspective, the list of CSGs to which the UE is considered CSG member should be managed. The list of CSGs is referred to as CSG white-list for the UE. Operator should also manage CSG subscription data of its subscribers.

The CSG subscription data of UEs are stored in Home Subscriber Server (HSS). The CSG subscription data is transferred to MME when UE registers with network. For a UE, the CSG subscription data is stored in Universal Subscriber Identity Module (USIM) of the UE.

Figure 12:
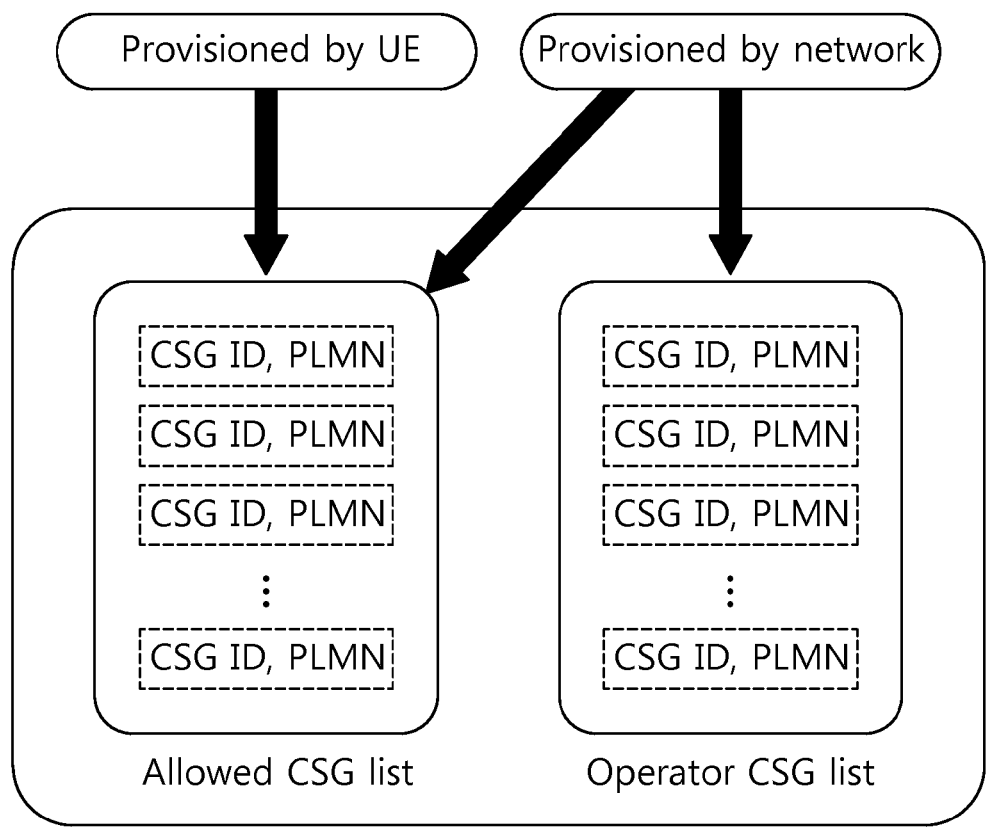
FIG. 12 illustrates an example of CSG white-list structure.

FIG. 12 illustrates an example of CSG white-list structure.

As shown in the FIG. 12, CSG white-list consists of 'Allowed CSG list' and 'Operator CSG list'. The Allowed CSG list can be provisioned by both UE and network, while the Operator CSG list is only provisioned by network. CSG provisioning can be carried out by Open Mobile Alliance Device Management (OMA DM) procedures or by Over-The-Air (OTA) technologies. NAS procedures are also used for CSG provisioning in case of manual CSG selection, where CSG white-list can be updated during e.g. attach or tracking area update procedure.

Both "Allowed CSG list" and "Operator CSG list" consist of a list of entries which of each comprises a CSG identity and a PLMN identity that is associated with the CSG identity in the same entry. The UE considers that the CSG identity stored in CSG white-list is valid only within the scope of associated PLMN.

MDT (Minimization of Driving Tests) will be described.

Instead of performing drive test to measure quality of a cell by using a vehicle conventionally by business operators to optimize cell coverage, MDT allows a UE to perform measurement and report the result. The coverage varies according to a location of a base station, disposition of surrounding buildings, and a usage environment of a user. Thus, a business operator is required to periodically perform drive testing, which incurs a great amount of costs and resources. Thus, in order to overcome such shortcomings, MDT allowing a business operator to measure coverage by using a terminal is proposed.

A business operator may create a coverage map indicating service availability and a distribution of quality of service over the general regions in which the business operator provides services by synthesizing MDT measurement values received from several UEs, and utilize the same for network operation and optimization. For example, when the business operator receives a report on a coverage issue of a particular area from a UE, the business operator increases transmission power of a BS providing a service of the corresponding area to extend coverage of the corresponding area cell. Through this method, time and costs for network optimization can be minimized.

MDT was made based on a framework having a tracking function as one of tools of an operator for OAM (operation, administration, and maintenance). The tracing function provides ability to an operator to trace and log behaviors of a UE, making it possible to determine a major cause of a defective function of a UE. Traced data is collected by a network, which is called a TCE (trace collection entity). The operator uses data collected by the TCE for the purpose of analysis and evaluation. The tracing function used for MDT includes signaling based on the tracing function and a management based on the tracing functions. The tracing function-based signaling is used to activate an MDT operation toward a particular UE, while the tracing function-based management is used to activate an MDT operation without being limited to a particular UE.

MDT may be divided into two types of MDTs; a logged MDT and an immediate MDT according to whether or not a UE reports measured or stored log data in non-real time or in real time. The logged MDT is a method that a UE performs MDT measurement, logs corresponding data, and transmits the same to a network later. Meanwhile, the immediate MDT is a method that a UE performs MDT measurement and immediately transmits corresponding data to a network. According to the logged MDT, the UE performs MDT measurement in an RRC idle state, while according to the immediate MDT, the UE performs MDT measurement in an RRC connected state.

Figure 13:
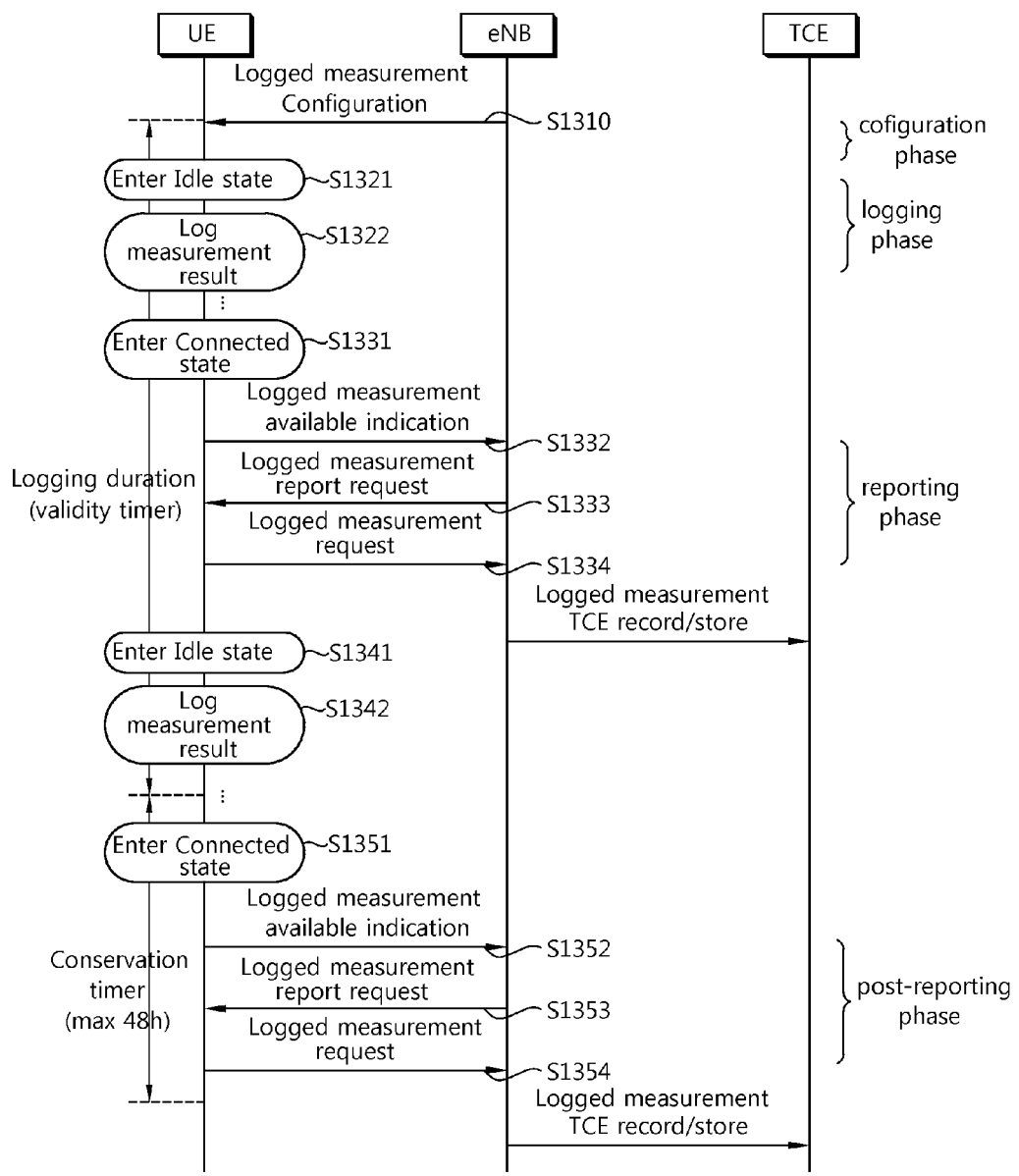
FIG. 13 is a flow chart illustrating a method for performing logged MDT.

FIG. 13 is a flow chart illustrating a method for performing logged MDT.

Referring to FIG. 13, a UE receives a logged measurement configuration (S1310). The logged measurement configuration may be included in an RRC message and transmitted on a downlink control channel. The logged measurement configuration may include at least one of reference time information, a logging duration, a logging interval, information regarding an area configuration. The logging interval indicates an interval storing a measurement result. The logging duration indicates a duration in which a UE performs logged MDT. The reference time indicates a time as a reference of a continuation time during the logged MDT is performed. The area configuration indicates an area required for the UE to perform logging.

Meanwhile, when the UE receives the logged measurement configuration, it starts a validity timer. The validity timer refers to a lifetime of the logged measurement configuration, which may be specified by information regarding the logging duration. The duration of the validity timer may indicate validity of measurement results of the UE, as well as the valid lifetime of the logged measurement configuration.

The procedure in which the UE configures the logged measurement and various procedures are performed is called a configuration phase.

When the UE enters an RRC idle state (S1321), the UE loges the measurement result while the valid timer is being driven (S1322). The measurement result value may include RSRP, RSRQ, RSCP (received signal code power), Ec/No, or the like. Hereinafter, measurement result-logged information is called logged measurements. A temporal interval during which the UE logs the measurement results at least one or more times is called a logging phase.

Performing of logged MDT based on the logged measurement configuration by the UE may vary according to a location of the UE.

Figure 14:
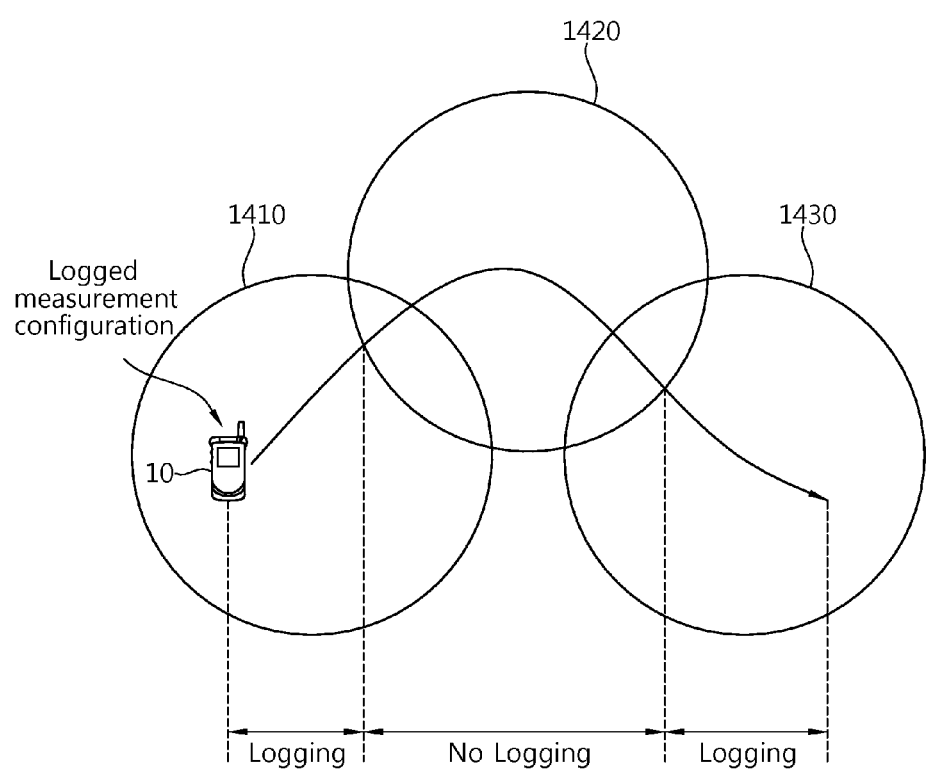
FIG. 14 illustrates logged MDT according to logging areas.

FIG. 14 illustrates logged MDT according to logging areas.

A network may configure a logging area, an area to which a UE should log. The logging area may be expressed as a cell list or a tracking area/location area list. In case that a logging area is set for the UE, when the UE moves out of the logging area, logging is stopped.

Referring to FIG. 14, a first area 1410 and a third area 1430 are areas set as logging areas, and a second area 1420 is an area in which logging is not allowed. The UE performs logging in the first area 1410, while the UE does not perform logging in the second area 1420. When the UE moves from the second area 1420 to the third area 1430, the UE performs logging again.

Figure 15:
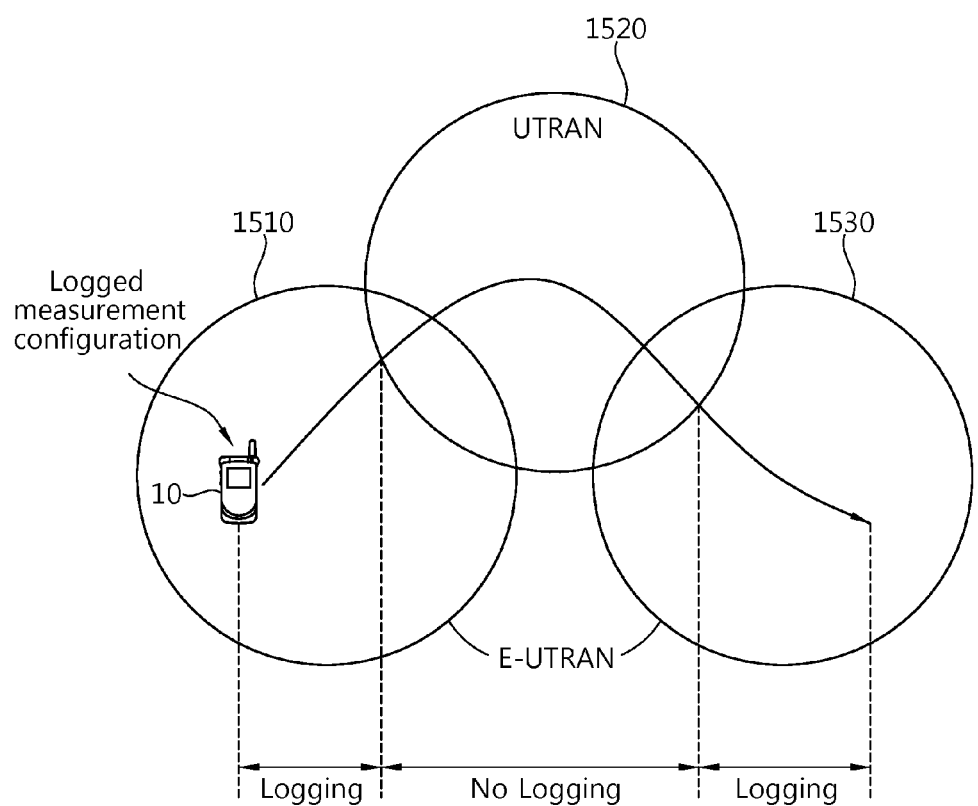
FIG. 15 illustrates logged MDT according to a change in RAT.

FIG. 15 illustrates logged MDT according to a change in RAT.

A UE performs logging only when it camps on in an RAT in which a logged measurement configuration is received, and stops logging in a different RAT. The UE may log cell information of a different RAT other than the RAT in which the UE is camped on.

A first area 1510 and a third area 1530 are E-UTRAN areas, and a second area 1520 is a UTRAN area. The logged measurement configuration is received from the E-UTRAN. When the UE enters the second area 1520, it does not perform MDT measurement.

Referring back to FIG. 13, the UE enters the RRC-connected state (S1331), and when there is a logged measurement to be reported, the UE informs the BS that there is a logged measurement to be reported (S1332). The UE may inform the BS that there is a logged measurement when an RRC connection is established, when an RRC connection is re-established, or when an RRC connection is reconfigured. Also, when the UE performs handover, the UE may inform a handover target cell that there is a logged measurement. When the UE informs the BS that there is a logged measurement, the UE may include a logged measurement availability indicator as indication information indicating that there is a logged measurement in an RRC message to be transmitted to the BS, and transmits the same. The RRC message may be an RRC connection configuration complete message, an RRC connection reestablishment complete message, an RRC reconfiguration complete message, or a handover complete message.

When the BS receives a signal indicating that there is a logged measurement from the UE, the BS requests the UE to report on the logged measurement (S1333). In requesting the UE to report on the logged measurement, the BS may include a logged measurement report request parameter regarding corresponding instruction information in an RRC message and transmit the same. The RRC message may be a UE information request message.

When UE receives the request for reporting the logged measurement from the BS, the UE reports the logged measurement to the BS (S1334). When reporting the logged measurement to the BS, the UE may include logged measurement report including logged measurements in an RRC message and transmit the same. The RRC message may be a UE information report message. When reporting the logged measurement, the UE may report the entire logged measurements of the UE at the timing of report to the BS or some of the logged measurements to the BS. When the UE reports some of the logged measurements, the reported logged measurements may be discarded.

The process in which the UE informs the BS that there is a logged measurement, receives a request for reporting the logged measurement from the BS, and the UE reports the logged measurement to the BS is called a reporting phase.

While the logged MDT is being performed, the UE largely measures a radio environment. The MDT measurement may include a cell identity, a signal quality and/or signal strength of a cell. The MDT measurement may include a measurement time and a measurement place. A table below illustrates content the UE logs.

TABLE 4

| Parameter(set) | Description |
|---|---|
| Serving cell identity | global cell identity of serving cell |
| Measured results of serving cell | Measured Reference Signal Received Power (RSRP) of serving cell<br>Measured Reference Signal Received Quality (RSRQ) of serving cell |
| Measured results of neighbor cell | Cell Identities of measured E-UTRA cells, Measured results of E-UTRA cells<br>Cell Identities of measured UTRA cells, Measured results of UTRA cells<br>Cell Identities of measured GERAN cells, Measured results of GERAN cells<br>Cell Identities of measured CDMA 2000 cells, Measured results of CDMA 2000 cells |
| Time stamp | The moment of logging measurement results, calculated as {current time minus absoluteTimeStamp} in seconds |
| Location information | Detailed location information at the moment of logging |

Information logged at each different logging timing may be stored such that it is discriminated by different log entries as follows.

Figure 16:
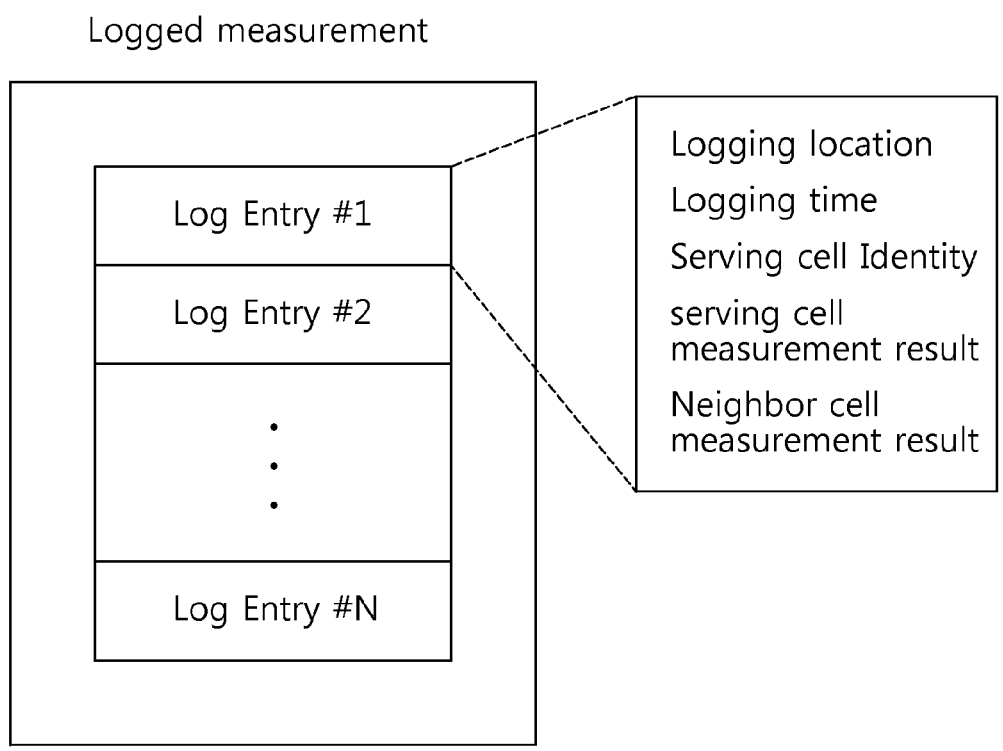
FIG. 16 illustrates logged measurement.

FIG. 16 illustrates logged measurement.

The logged measurement includes one or more log entries.

The log entries include a logging location, a logging time, a serving cell identity, a serving cell measurement result, and a neighbor cell measurement result.

The logging location indicates a location measured by the UE. The logging time indicates a time measured by the UE. Information logged at a different logging time is stored in a different log entry.

The serving cell identity may include a cell identity in a layer 3, which is called a GCI (Global Cell Identity). The GCI is a set of a PCI (Physical Cell Identity) and a PLMN.

Meanwhile, the UE may analyze indicators related to performance of the UE in addition to a radio environment and perform logging. For example, the indicators may include throughput, an erroneous transmission/reception rate, and the like.

Referring back to FIG. 13, the foregoing logging phase and the reporting phase may exist within the logging duration a plurality of times (S1341, S1342).

When the BS receives a report on the logged measurement, the BS may record/store it in a TCE.

After the validity timer expires, namely, when a logging duration has lapsed, if the UE has a logged measurement not reported yet, the UE may perform a procedure for reporting it to the BS. A procedure in which various procedures therefor are performed is called a post-reporting phase.

When the logging duration is terminated, the UE discards the logged measurement configuration and starts a conservation timer. After the logging duration is terminated, the UE stops the MDT measurement. However, an already logged measurement is not discarded but maintained. The conservation timer indicates a lifetime of the remaining logged measurement.

When the UE enters the RRC-connected state before the conservation timer expires (S1451), the UE may report the logged measurement not reported yet to the BS. In this case, the foregoing procedure for reporting the logged measurement may be performed (S1452, S1453, S1454). When the conservation timer expires, a remaining logged measurement may be discarded. When the BS receives a report on the logged measurement, the BS may record/store it in the TCE.

The conservation timer may be previously set as a predetermined value in the UE. For example, a value of the conservation timer may be 48 hours. Alternatively, the value of the conservation timer may be included in the logged measurement configuration and transferred to the UE, or may be included in a different RRC message and transferred to the UE.

Meanwhile, when a new logged measurement configuration is transferred to the UE, the UE may update an existing logged measurement configuration with the newly obtained logged measurement configuration. In this case, the validity timer may start again from a point in time at which the logged measurement configuration is newly received. Also, the logged measurement based on the previous logged measurement configuration may be discarded.

Figure 17:
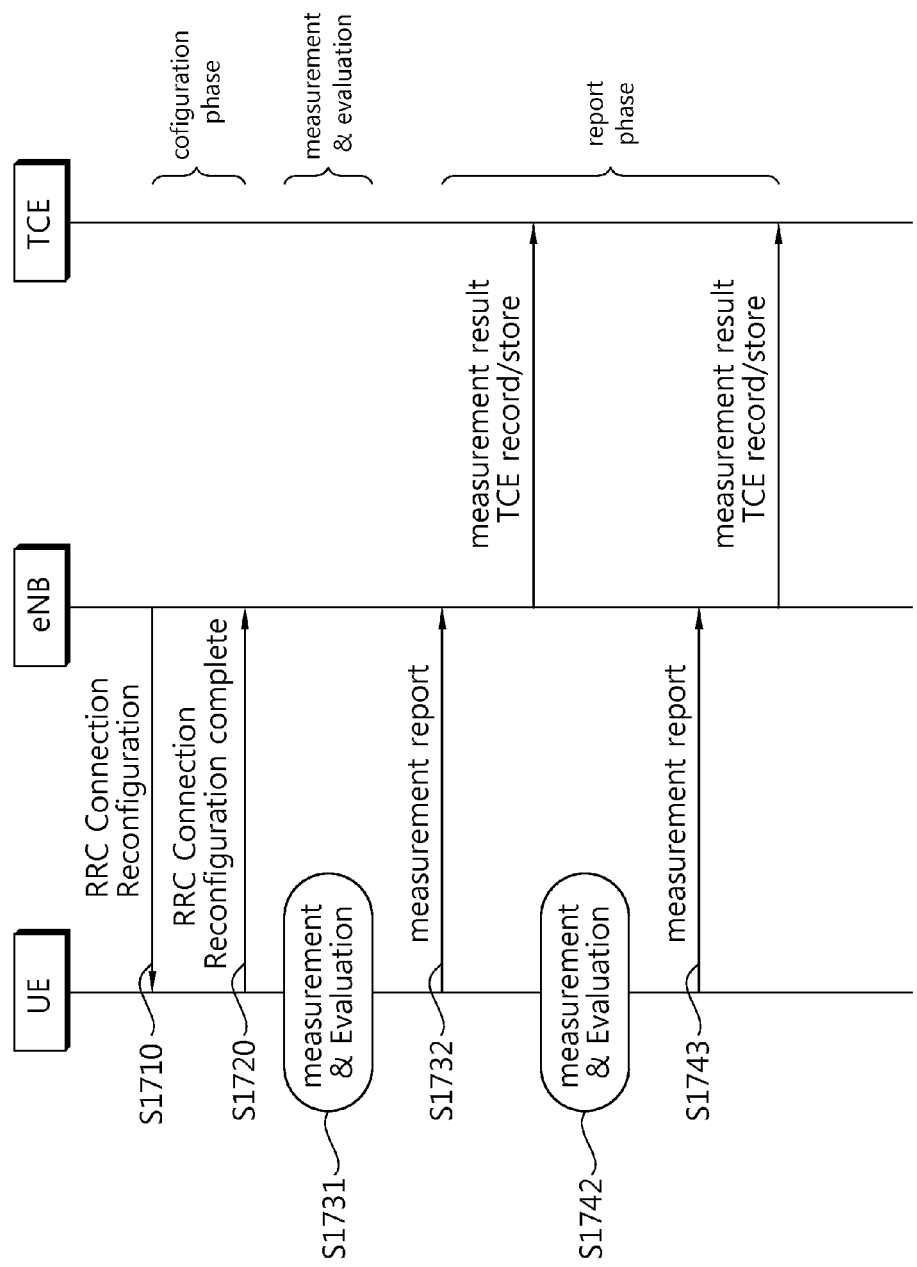
FIG. 17 illustrates the immediate MDT.

FIG. 17 illustrates the immediate MDT. The immediate MDT is based on an RRM (radio resource management) measurement and report mechanism, and in the event of additional measurement report, information regarding a location is added and reported to the BS.

Referring to FIG. 17, the UE receives an RRC connection reconfiguration message (S1710), and transmits an RRC connection reconfiguration complete message (S1720). Through this, the UE enters an RRC-connected state. The UE may receive a measurement configuration by receiving the RRC connection reconfiguration message. The measurement configuration in the illustration of FIG. 17 is received through an RRC connection reconfiguration message, but it may also be included in a different RRC message and transmitted.

The UE performs a measurement and evaluation in the RRC-connected state (S1731) and reports the measurement result to the BS (S1732). In the immediate MDT, the measurement result may be able to provide accurate location information, if possible, as in the illustration of the GNSS (global navigation satellite system) location information. For a location measurement such as an RF fingerprint, neighbor cell measurement information that may be used for determining a location of the UE may also be provided.

In FIG. 17, it can be seen that, even after the measurement and evaluation (S1731) and report (S1732) performed first, the UE performs measurement and evaluation (S1741) and reports the measurement result to the BS (S1742). This is a significant difference of the immediate MDT over the logged MDT.

Next, a Multimedia Broadcast and Multicast service (MBMS) will be described.

A transport channel MCH for the MBMS may be mapped a logical channel MCCH or MTCH. The MCCH transmits a RRC message related to the MBMS, and the MTCH transmits traffic of a particular MBMS service. There is a MCCH at every a MBMS Single Frequency Network (MBSFN) area in which the same MBMS information/traffic is tramsmitted. And, in case that a plurality of MBMS areas are provided in a cell, the UE may receives a plurality of MCCHs. When a RRC message related to the MBMS is changed on a predetermined MCCH, a PDCCH transmits a MBMS Radio Network Temporary Identity (M-RNTI) and an indicator indicates the predetermined MCCH. The UE supporting the MBMS receives the M-RNTI and the MCCH indicator by the PDCCH, recognizes that the RRC message related to the MBMS has been changed, and receives the predetermined MCCH. The RRC message of the MCCH may be changed at every changing period, and repeatedly broadcasted at every changing period.

While the UE is provided with the MBMS, the UE may further be provided with a dedicated service. For example, a user watches TV by the MBMS by using a smart phone, and simultaneously chats with other people by using an instant messaging service such as MSN or Skype through the smart phone. In this case, the MBMS is provided via the MTCH which several UEs receive together. And, the dedicated service respectively provided each UE, such as an IM service, may be provided via a dedicated bearer such as the DCCH or the DTCH.

In an area, some BS may simultaneously use several frequencies. For efficiently using a radio resource, the network selects a frequency among the several frequencies, provides the MBMS on the selected frequency and the dedicated bearer on all frequencies.

In case that the UE has been provided with a service on a frequency by using the dedicated bearer and the MBMS cannot be provided on the frequency, if the UE wants to be provided with the MBMS, the MBMS has to handover to other frequency on which the MBMS is provided. For this, the UE transmits a MBMS interest indication to a BS. Namely, when the UE wants to receive the MBMS, the UE transmits the MBMS interest indication. The network receives the MBMS interest indication, recognizes that the UE want to receive the BMS, and then move the UE to the corresponding frequency. The MBMS interest indication includes information indicating that the UE wants to receive the MBMS. Additionally, the MBMS interest indication further includes another information indicates a frequency to which the UE wants to move.

A UE intending to receive a predetermined MBMS first grasps frequency information and broadcasting time information related to the predetermined service. If the MBMS is already broadcasted or will be broadcasted soon, the UE apply the highest priority to the frequency on which the MBMS service is provided. The UE performs a cell reselection procedure by using reconfigured frequency priority information, moves to a cell providing the MBMS, and then receives the MBMS service. If the UE has knowledge on which frequency an MBMS service of interest is provided, it may consider that frequency to be the highest priority during the MBMS session as long as it reselects cells broadcasting SIB13.

As above mentioned, if the UE is camped on a suitable CSG cell or a cell providing the MBMS, the UE applies the highest priority, which is higher higher than any other priority set by a network, to the suitable CSG cell or the cell providing the MBMS, and then the applied priority is reflected in a measurement and a cell reselection.

Meanwhile, when the UE in the above state receives a logged measurement configuration for performing a logged MDT, the UE performs only an equal or lower priority frequency measurement in inter-frequency measurement process due to the highest priority applied to the serving frequency. However, the equal or lower priority frequency measurement is only performed when a quality of the serving cell is lower than a predetermined threshold value, thereby a measurement by the UE is limited. This feature will be described in greater details on reference to an attached FIG. 18

Figure 18:
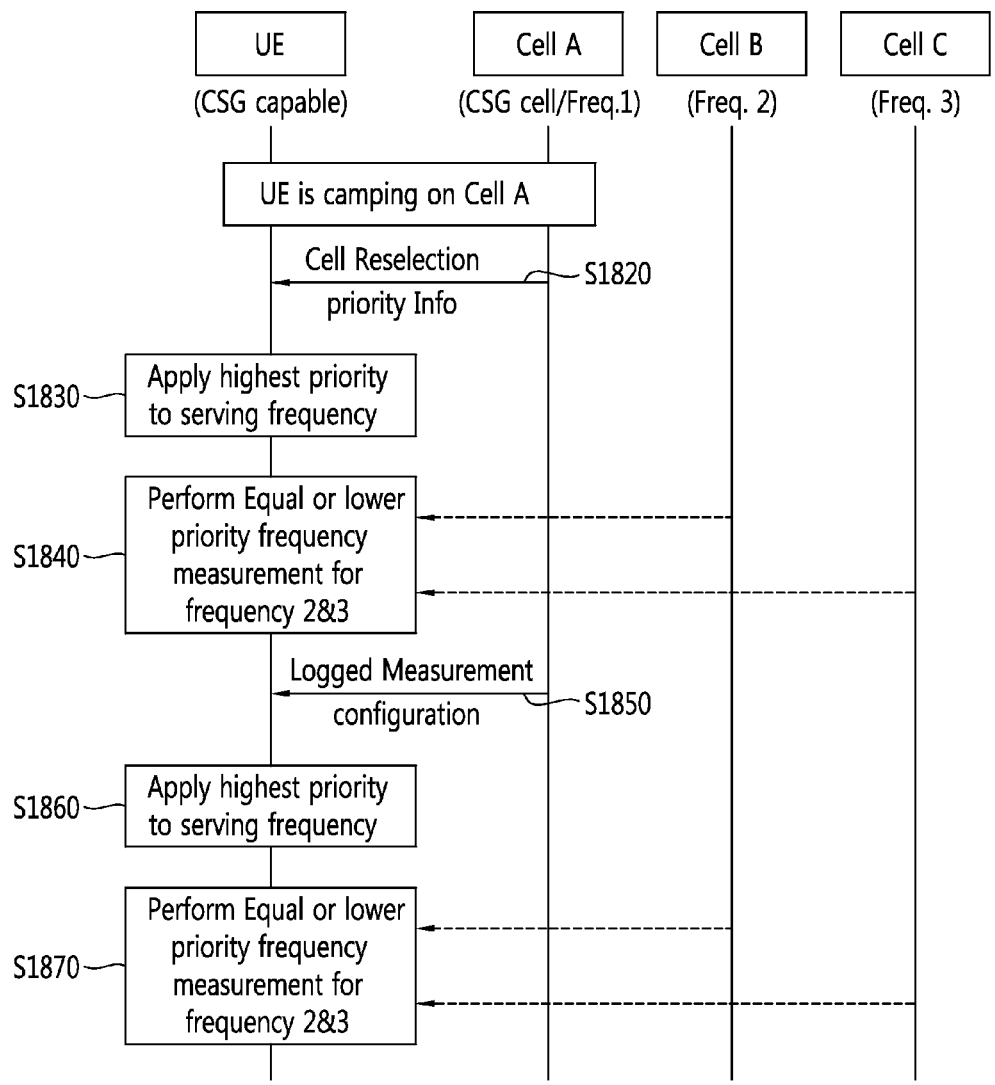
FIG. 18 is a diagram showing a measurement method performed by a UE camped on a CSG cell.

FIG. 18 is a diagram showing a measurement method performed by a UE camped on a CSG cell.

Referring the FIG. 18, the UE supports a CSG feature, and is camping on a Cell A which is a suitable CSG cell (step S1810). The Cell A is operating on a frequency 1.

The UE receives cell reselection priority information from a network (step S1820). The cell reselection priority information may be transmitted from the Cell A. The cell reselection priority information indicates that a priority of a frequency 2 is highest, and a priority of the frequency 1 is higher than a priority of a frequency 3.

Although, the priority of frequency 2 is higher than the priority of the frequency 1, the UE applies the highest priority to the frequency 1 because the Cell A is a suitable CSG cell on which the UE is camping (step S1830). Therefore, the UE performs the equal or lower priority frequency measurement for the frequency 2 and the frequency 3 (step S1840). That is, the UE measures the frequency 2 and the frequency 3 when the quality of the Cell A, which is the serving cell, is lower than the predetermined threshold value.

The UE receives a logged measurement configuration for performing a logged MDT (step S1850). The UE, which received the logged measurement configuration, measures the serving cell and at least one neighbor cell, logs the measurement result and reports the logged measurement to the network.

After the UE receives the logged measurement configuration, the UE may apply the highest priority to the frequency 1 which is the serving frequency (step S1860).

The UE performs the equal or lower priority frequency measurement for the frequency 2 and the frequency 3 (step S1870). Namely, the UE measures the Cell B on the frequency 2 and the Cell C on the frequency 3, when the quality of the Cell A is lower than the predetermined threshold value.

The UE logs an available measurement result and report the logged measurement to the network (step S1860). The measurement result for the frequency 2 and the frequency 3 is obtained when the quality of the serving cell is lower than the predetermined threshold value. Therefore, the measurement result obtained by the network may be severely limited.

As above mentioned, in the communication circumstance where the highest priority applied to a frequency on which the predetermined type cell, the logged measurement may include the restrictively obtained measurement result. The network receives the measurement result, but be unable to properly optimize an operation of the network in basis of the result. Therefore, although the UE is camping on the predetermined type cell, it is needed that a condition of the measurement is changeably applied in the logged MDT process.

Figure 19:
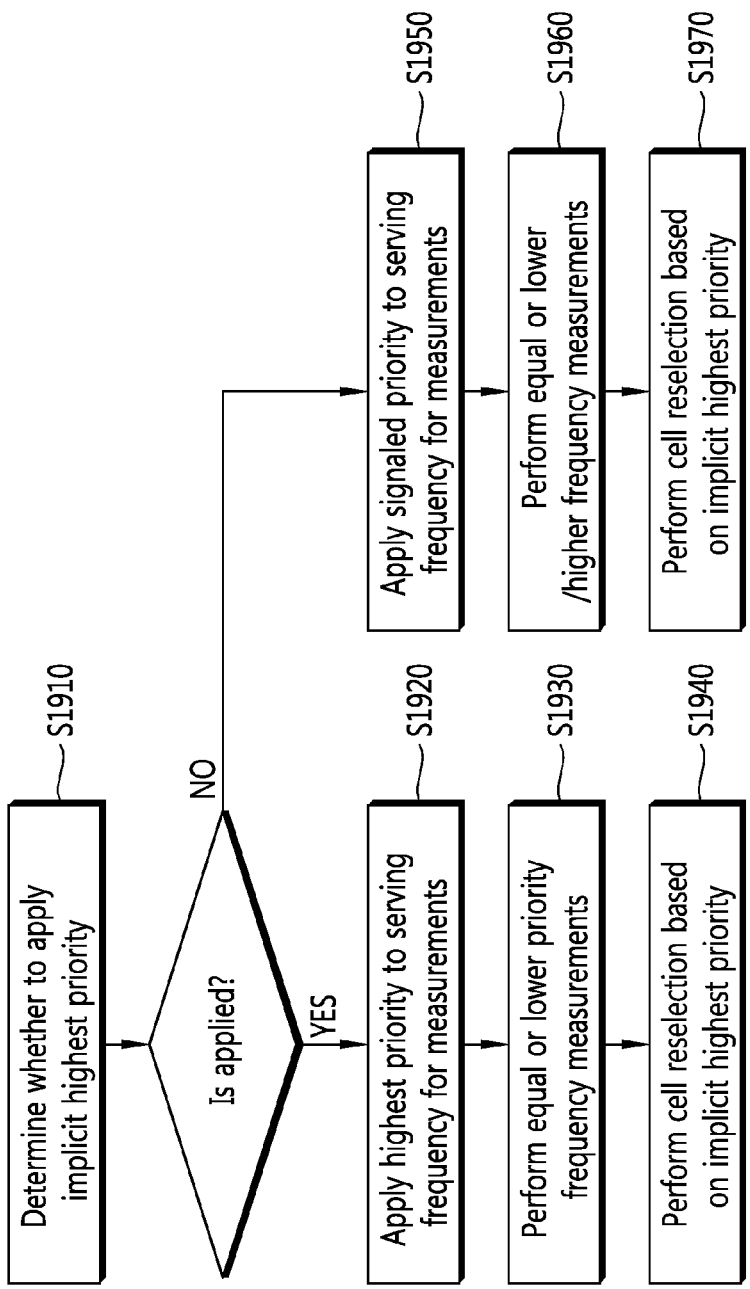
FIG. 19 is a flow chart showing a measurement method performed by the UE according to an embodiment of the present invention.

FIG. 19 is a flow chart showing a measurement method performed by the UE according to an embodiment of the present invention.

Referring to the FIG. 19, the UE determines whether to apply implicit highest priority to the serving frequency (step S1910). As above mentioned, if a type of the serving cell is the predetermined type, the UE applies the highest priority to the serving frequency. On the contrary, in the present invention, it is proposed that the UE determined whether to apply the implicit highest priority according to whether a particular condition is satisfied or not.

The UE may determines whether to apply the implicit frequency highest priority to the serving frequency based on whether the serving cell is the predetermined type cell and whether the UE has received the logged measurement configuration for performing the logged MDT. If the serving cell is not the predetermined type cell, or if the serving cell is the predetermined type cell and the UE has received the logged measurement configuration, the UE does not apply the highest priority to the serving cell, but applies a signaled priority which is a priority signaled by cell reselection priority information from the network. If the serving cell is the predetermined type cell and the UE has not received the logged measurement configuration, the UE applies the highest priority to the serving frequency. In the step S1910, the selective application of the highest priority or the signaled priority to the serving cell is restricted in the measurement procedure performed by the UE. In other words, although the UE determines to apply the signaled priority to the serving frequency, the UE may apply the highest priority to the serving frequency in a cell reselection procedure.

The UE, which determined to apply the implicit highest priority, applies the highest priority to the serving frequency for the measurement (step S1920).

Since there is no frequency having a higher priority than the priority of the serving frequency, the UE performs the equal or lower priority frequency measurement (step S1930). When the quality of the serving cell becomes lower than the predetermined threshold value, the UE may measure other frequencies.

The UE which has determined to apply the implicit highest priority applies the highest priority to the serving frequency, and performs the cell reselection (step S1940).

Meanwhile, the UE, which determined not to apply the highest priority but to apply the signaled priority to the serving frequency, applies the signaled to the serving frequency (step S1950).

The UE performs the higher priority frequency measurement for a frequency having a priority higher than that of the serving frequency. And, the UE performs the equal or lower frequency measurement for a frequency having a priority equal to or lower than that of the serving frequency (step S1960). When a priority of a frequency is higher than the priority of the serving frequency, the UE measures the frequency. However, in case that the priority of the frequency is lower than the priority of the serving frequency, the UE may measure the frequency if a quality of the serving cell becomes lower than a predetermined threshold value. And then, the UE may perform the measurement and the logging based on information in the logged measurement configuration.

Unlike the measurement, the UE applies the highest priority to the serving frequency and performs the cell reselection (step S1970). That is, the signaled priority is applied to the serving frequency for the measurement in accordance with the determination of the UE, but the highest priority is applied to the serving frequency for the cell reselection.

In the following, a measurement method according to an embodiment of the present invention will be specifically described with examples of a specific cell type.

Figure 20:
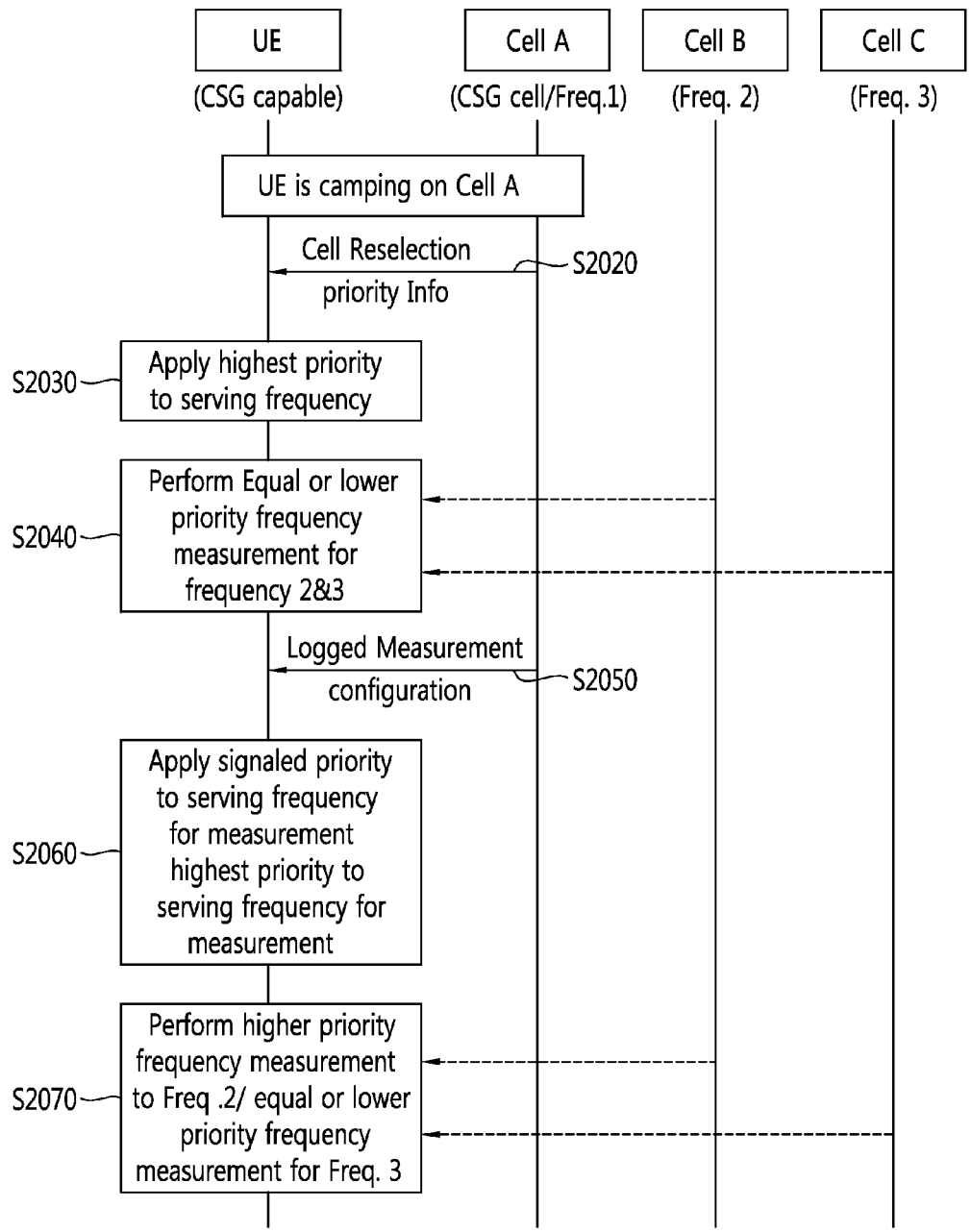
FIG. 20 is a flow chart showing an example of a measurement method according to an embodiment of the present invention.

FIG. 20 is a flow chart showing an example of a measurement method according to an embodiment of the present invention. A predetermined type is a suitable CSG cell in the example of FIG. 20. A cell A is a CSG cell and operates on a frequency 1. A cell B operates on a frequency 2, and a cell c operates on a frequency 3.

Referring FIG. 20, the UE supports the CSG and is camping on the cell A (step S2010).

The UE receives cell reselection priority information from a network (step S2020). The cell reselection priority information may indicate signaled priorities for the frequencies of the cells, and the signaled priorities may be configured by the network. The cell reselection priority information may be transmitted from the cell A. The cell reselection priority information indicates that a priority of a frequency 2 is highest, and a priority of the frequency 1 is higher than a priority of a frequency 3.

The priority of the frequency 2 is higher than the priority of the frequency 1 on which the UE is camping. However, as the cell A is a suitable CSG cell and the UE is camping on the cell A, the UE applies the highest priority to the frequency 1 (step S2030). Therefore, the UE performs the equal of lower priority frequency measurement for the frequency 2 and the frequency 3 (step S2040). Namely, the UE measures the frequency 2 and the frequency 3, when a quality of the cell A, the serving cell, becomes lower than a predetermined threshold value.

The UE receives a logged measurement configuration for performing a logged MDT (step S2050).

The UE, which received the logged measurement configuration, does not apply the highest priority to the serving frequency for the measurement. That is, the UE applies the signaled priority to the serving frequency for the cell measurement (step S2060). Therefore, the priority of the serving frequency for the measurement is lower than that of the frequency 2 and higher than that of the frequency 3.

The UE performs a higher priority frequency measurement for the frequency 2 of which priority is higher than the priority of the serving frequency. However, the UE performs the equal or lower priority frequency measurement for the frequency 3 of which priority lower than the priority of the serving frequency (step S2070). The UE may obtain a measurement result of the frequency 2 and a measurement result of the frequency 3, and log the measurement results. The UE may report the logged measurement to the network.

Figure 21:
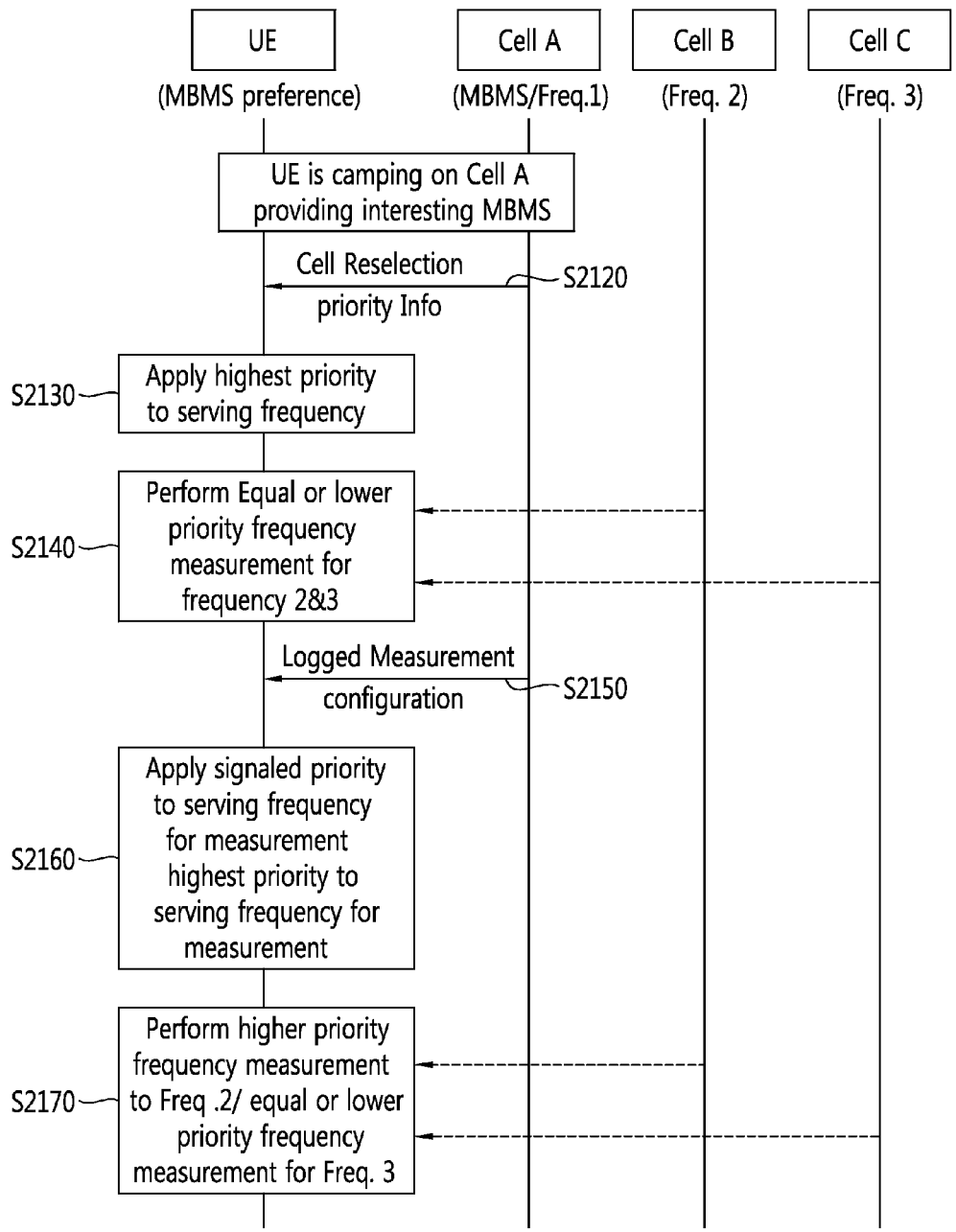
FIG. 21 is a flow chart showing another example of a measurement method according to an embodiment of the present invention.

FIG. 21 is a flow chart showing another example of a measurement method according to an embodiment of the present invention. A predetermined type is a cell providing a MBMS in which the UE is interested. A cell A is a cell supporting the MBMS and operates on a frequency 1. A cell B operates on a frequency 2, and a cell c operates on a frequency 3.

Referring FIG. 21, the UE prefers the MBMS, and is camping on the cell A supporting the MBMS in which the UE is interested (step S2110).

The UE receives cell reselection priority information from a network (step S2120). The cell reselection priority information may indicate signaled priorities for the frequencies of the cells, and the signaled priorities may be configured by the network. The cell reselection priority information may be transmitted from the cell A. The cell reselection priority information indicates that a priority of a frequency 2 is highest, and a priority of the frequency 1 is higher than a priority of a frequency 3.

The priority of the frequency 2 is higher than the priority of the frequency 1 on which the UE is camping. However, as the cell A is a cell supporting the MBMS in which the UE camped on the cell is interested, the UE applies the highest priority to the frequency 1 (step S2130). Therefore, the UE performs the equal of lower priority frequency measurement for the frequency 2 and the frequency 3 (step S2140). Namely, the UE measures the frequency 2 and the frequency 3, when a quality of the cell A, the serving cell, becomes lower than a predetermined threshold value.

The UE receives a logged measurement configuration for performing a logged MDT (step S2150).

The UE, received the logged measurement configuration, does not apply the highest priority to the serving frequency for the measurement. That is, the UE applies the signaled priority to the serving frequency for the cell measurement (step S2160). Therefore, the priority of the serving frequency for the measurement is lower than that of the frequency 2 and higher than that of the frequency 3.

The UE performs a higher priority frequency measurement for the frequency 2 of which priority is higher than the priority of the serving frequency. However, the UE performs the equal or lower priority frequency measurement for the frequency 3 of which priority lower than the priority of the serving frequency (step S2170). The UE may obtain a measurement result of the frequency 2 and a measurement result of the frequency 3, and log the measurement results. The UE may report the logged measurement to the network.

In the above FIGS. 19 to 21, the UE determines whether to apply the signaled to the serving frequency according to whether the serving cell operating on the serving frequency corresponds to the predetermined type cell and whether the UE has received the logged measurement configuration. The logged measurement configuration is a simple example as a condition for the determination of the UE. That is, a general message, which is transmitted from the network to the UE and requests the measurement and the report for understanding a network circumstance and optimizing of a network performance, may be used as the condition for the determination of the UE.

In case that a UE is camped on a predetermined cell, the measurement method according to the present invention can complement a problem that the network obtains a restricted measurement result needed for understanding a network circumstance and optimizing the network performance due to a restricted measurement of the UE. The network can obtain a measurement result of a non-serving frequency, and then provide the UE with a more optimized service. Furthermore, since the highest priority is applied to the serving frequency in a cell reselection process, the UE can maintain access to the serving cell of the predetermined type and receives an enhanced service.

Figure 22:
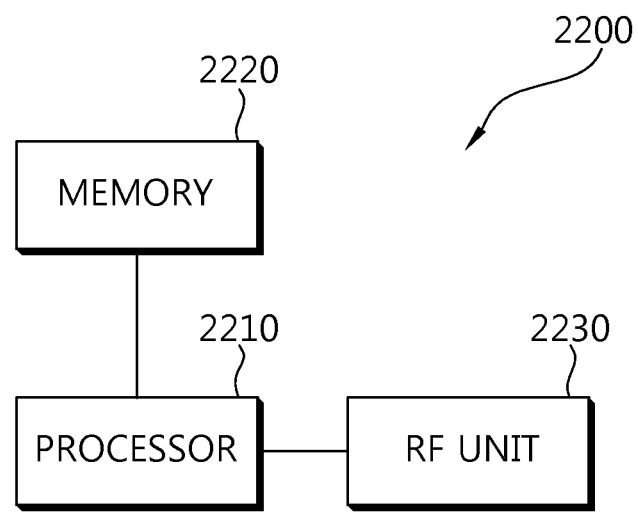
FIG. 22 is a block diagram showing a wireless apparatus according to an embodiment of the present invention.

FIG. 22 is a block diagram showing a wireless apparatus according to an embodiment of the present invention. The apparatus implements an operation of a UE according to the embodiments of FIGS. 19 to 21.

A wireless apparatus 2200 includes a processor 2210, a memory 2220, and a radio frequency (RF) unit 2230. The processor 2210 implements the proposed functions, procedures, and/or methods. The processor 2210 may be configured to determine whether to a signaled priority or the highest priority to a serving frequency. The processor (2210) is configured to consider a type of a serving cell and a measurement configuration message for the determination. The processor (2210) is configured to perform a measurement by applying the determined priority. The embodiments of FIGS. 19 to 21 can be implemented by the processor 2210 and the memory 2220.

The RF unit 2230 coupled to the processor 2210 transmits and receives a radio signal.

The processor may include an application-specific integrated circuit (ASIC), a separate chipset, a logic circuit, and/or a data processing unit. The memory may include a read-only memory (ROM), a random access memory (RAM), a flash memory, a memory card, a storage medium, and/or other equivalent storage devices. The RF unit may include a base-band circuit for processing a radio signal. When the embodiment of the present invention is implemented in software, the aforementioned methods can be implemented with a module (i.e., process, function, etc.) for performing the aforementioned functions. The module may be stored in the memory and may be performed by the processor. The memory may be located inside or outside the processor, and may be coupled to the processor by using various well-known means.

Although the aforementioned exemplary system has been described on the basis of a flowchart in which steps or blocks are listed in sequence, the steps of the present invention are not limited to a certain order. Therefore, a certain step may be performed in a different step or in a different order or concurrently with respect to that described above. Further, it will be understood by those ordinary skilled in the art that the steps of the flowcharts are not exclusive. Rather, another step may be included therein or one or more steps may be deleted within the scope of the present invention.

The invention claimed is:

1. A method for measuring performed by a user equipment (UE) in a wireless communication system, the method comprising:
    camping on a serving cell operating on a serving frequency A;
    receiving a reselection priority information, the reselection priority information indicating signaled priorities for the serving frequency A, an inter-frequency B, and an inter-frequency C, wherein the signaled priority for the serving frequency A is lower than the signaled priority for the inter-frequency B, and the signaled priority for the serving frequency A is higher than the signaled priority for the inter-frequency C;
    applying a highest priority to the serving frequency A by performing an equal or lower priority frequency measurement for the inter-frequencies B and C, when a quality of the serving cell becomes lower than a predetermined threshold value;
    determining whether a logged measurement configuration for a logged minimization driving test (MDT) is received; and
    when the UE receives the logged measurement configuration for the MDT and a type of the serving cell is a predetermined type, applying the signaled priority for the serving frequency A, to the serving frequency A with respect to a measurement operation, and applying the highest priority to the serving frequency A with respect to a cell reselection operation, wherein a higher priority frequency measurement is performed for the inter-frequency B, and wherein an equal or lower priority frequency measurement is performed for the inter-frequency C.

2. The method of claim 1, wherein the predetermined type of the serving cell is a member closed subscriber group (CSG) cell to which the UE is allowed to access.

3. The method of claim 1, wherein the predetermined type of the serving cell is a cell providing a multimedia broadcast and multicast service (MBMS) in which the UE is interested.

4. The method of claim 1, wherein the UE determines whether to apply the highest priority to the serving frequency A based on, both, whether the serving cell is the predetermined type cell and whether the UE has received the logged measurement configuration for performing the MDT, and
    wherein the UE maintains access to the serving cell of the predetermined type as a result of the highest priority being applied to the serving frequency A with respect to the cell reselection operation.

5. An apparatus operating in a wireless communication system, the apparatus comprising:
    a Radio Frequency (RF) unit configured to transmit and receive radio signals; and a processor operatively coupled to the RF unit, wherein the processor is configured to:
    camp on a serving cell operating on a serving frequency A, receive a reselection priority indication, the reselection priority indication indicating signaled priorities for the serving frequency A, an inter-frequency B, and an inter-frequency C, wherein the signaled priority for the serving frequency A is lower than the signaled priority for the inter-frequency B, and the signaled priority for the serving frequency A is higher than the signaled priority for the inter-frequency C, determine whether a logged measurement configuration for a logged minimization driving test (MDT) is received, and when the UE receives the logged measurement configuration for the MDT and a type of the serving cell is a predetermined type, apply the signaled priority for the serving frequency A, to the serving frequency A with respect to a measurement operation, and apply the highest priority to the serving frequency A with respect to a cell reselection operation, wherein a higher priority frequency measurement is performed for the inter-frequency B, and wherein an equal or lower priority frequency measurement is performed for the inter-frequency C.

6. The apparatus of claim 5, wherein the predetermined type of the serving cell is a member closed subscriber group (CSG) cell to which the apparatus is allowed to access.

7. The apparatus of claim 5, wherein the predetermined type of the serving cell is a cell providing a multimedia broadcast and multicast service (MBMS) in which the apparatus is interested.

* * * * *